(12) United States Patent
Demiryurek et al.

(10) Patent No.: US 8,660,789 B2
(45) Date of Patent: Feb. 25, 2014

(54) HIERARCHICAL AND EXACT FASTEST PATH COMPUTATION IN TIME-DEPENDENT SPATIAL NETWORKS

(75) Inventors: Ugur Demiryurek, Redondo Beach, CA (US); Cyrus Shahabi, Irvine, CA (US)

(73) Assignee: University of Southern California, Los Angeles, CA (US)

( * ) Notice: Subject to any disclaimer, the term of this patent is extended or adjusted under 35 U.S.C. 154(b) by 115 days.

(21) Appl. No.: 13/455,035

(22) Filed: Apr. 24, 2012

(65) Prior Publication Data

US 2012/0283948 A1  Nov. 8, 2012

Related U.S. Application Data

(60) Provisional application No. 61/482,001, filed on May 3, 2011.

(51) Int. Cl.
*G01C 21/34* (2006.01)

(52) U.S. Cl.
USPC ................. 701/423; 701/414; 701/533; 703/2

(58) Field of Classification Search
USPC ......... 701/408–411, 414, 423, 465, 532, 533; 703/2
See application file for complete search history.

(56) References Cited

U.S. PATENT DOCUMENTS

| 6,141,552 A * | 10/2000 | Sendonaris et al. ......... 455/436 |
| 6,909,965 B1 | 6/2005 | Beesley et al. |
| 7,957,894 B2 * | 6/2011 | Wellmann ..................... 701/428 |
| 2006/0047421 A1 | 3/2006 | Goldberg et al. |
| 2008/0094250 A1 * | 4/2008 | Myr .............................. 340/909 |
| 2010/0262359 A1 | 10/2010 | Motoyama |

FOREIGN PATENT DOCUMENTS

| EP | 0833290 | 4/1998 |
| WO | 2009092812 | 7/2009 |
| WO | 2011004026 | 1/2011 |

OTHER PUBLICATIONS

Nakao et al, Scalable Routing Overlay Networks, ACM, SIGOPS Operating Systems Review, Jan. 2006, pp. 49-61.*
Li et al, Path-Finding Through Flexible Hierarchical Road Networks: An Experimental Approach Using Taxi Trajectory Data, International Journal of Applied Earth Observation and Geoinformation, vol. 13, Iss. 1, Feb. 2011, pp. 110-119.*
Delling, eta l., "Time-Dependent Route Planning", Robust and Online Large-Scale Optimization, Oct. 21, 2009, pp. 207-230.
Otinjac, Adina-Gabriela, Authorized Officer, European Patent Office, PCT/US2012/036012, Aug. 9, 2012, 15 pages.

(Continued)

*Primary Examiner* — Russell Frejd
(74) *Attorney, Agent, or Firm* — Fish & Richardson P.C.

(57) ABSTRACT

With real-world spatial networks the edge travel-times are time-dependent, where the arrival-time to an edge determines the actual travel-time on the edge. To speed up the path computation, exact and approximate techniques for computation of the fastest path in time-dependent spatial networks are presented. An exact fastest path computation technique based on a time-dependent A* search can significantly improve the computation time and storage complexity of existing approaches. Moreover, for applications with which approximate fastest path is acceptable, the approximate fastest path computation technique can improve the computation time by an order of magnitude while maintaining high accuracy (e.g., with only 7% increase in travel-time of the computed path on average). With experiments using real data-sets (including a variety of large spatial networks with real traffic data) the efficacy of the disclosed techniques for online fastest path computation is demonstrated.

23 Claims, 17 Drawing Sheets

(56) References Cited

OTHER PUBLICATIONS

R. Agrawal and V. H. Jagadish. Algorithms for searching massive graphs. ICDE, 1994, pp. 225-238.
Gernot Veit Batz and Daniel Delling and Peter Sanders and Christian Vetter. Time-Dependent Contraction Hierarchies. Alenex, 2009, pp. 97-105.
Adrijana Car and Andrew U. Frank. Modelling a hierarchy of space applied to large road networks. IGIS, 1994, pp. 1-10.
L. Cooke and E. Halsey. The shortest route through a network with timedependent internodal transit times. Journal of Mathematical Analysis and Applications, NJ, USA, 1966, pp. 493-498.
Dean,Brian C. Algorithms for min-cost paths in time-dependent networks with wait policies. Networks, NJ, USA, 2004, pp. 1-7.
Dehne, Frank and Omran, Masoud T. and Sack, Jörg-Rüdiger. Shortest paths in time-dependent FIFO networks using edge load forecasts. IWCTS, 2009, pp. 1-6.
Daniel Delling, Time-Dependent SHARC-Routing, ESA, 2008, pp. 1-30.
Daniel Delling and Dorothea Wagner. Landmark-based routing in dynamic graphs. WEA, 2007, pp. 52-65.
Ugur Demiryurek and Farnoush Banaei Kashani and Cyrus Shahabi. A Case for Time-dependent Shortest Path Computation in Spatial Networks. ACM SIGSPATIAL, Sep. 2010, pp 1-4.
Ugur Demiryurek and Farnoush Banaei Kashani and Cyrus Shahabi. Efficient K-Nearest Neighbor Search in Time-Dependent Spatial Networks. DEXA, Aug. 2010, pp. 1-17.
Stuart E. Dreyfus. An Appraisal of Some Shortest-Path Algorithms. Operations Research vol. 17, No. 3, 1969, 45 pgs.
Andrew V. Goldberg and Chris Harellson. Computing the Shortest Path: A* Search Meets Graph Theory. SODA, pp. 422-432, 2005.
Baris Guc and Anand Ranganathan. Real-time, Scalable Route Planning using Stream-Processing Infrastructure. ITS, NJ, USA, 2010, pp. 986-991.
Hart, Peter and Nilsson, Nils and Raphael, Bertram. A Formal Basis for the Heuristic Determination of Minimum Cost Paths. IEEE Transactions on Systems Science and Cybernetics, 1968, pp. 100-107.
Ekkehard Köhler and Katharina Langkau and Martin Skutella. Time-Expanded Graphs for Flow-Dependent Transit Times. Proc. 10th Annual European Symposium on Algorithms, 2002, pp. 1-18.
Navteq,. http://www.navteq.com. Accessed in May 2010, 1 pg.
Ira Pohl. Bi-directional Search. Machine Intelligence,Edinburgh University Press, 1971, 170 pgs.
Potamias, Michalis and Bonchi, Francesco and Castillo, Carlos and Gionis, Aristides. Fast shortest path distance estimation in large networks. CIKM, 2009, pp. 867-876
Hanan Samet and Jagan Sankaranarayanan and Houman Alborzi. Scalable Network Distance Browsing in Spatial Databases. SIGMOD, pp. 33-40, Toronto, Canada, 2008.
P. Sanders and D. Schultes. Highway hierarchies hasten exact shortest path queries. ESA 2005, pp. 568-579.
Sanders, Peter and Schultes, Dominik. Engineering fast route planning algorithms WEA. 2007, pp. 23-36.
Teleatlas. http://www.teleatlas.com. Accessed in May 2010, 1 pg.
Varaiya, Pravin, "What We've Learned about Highway Congestion", Access, No. 27, Fall 2005, pp. 1-8.
Wagner, Dorothea and Willhalm,Thomas. Geometric Speed-Up Techniques for Finding Shortest Paths in Large Sparse Graphs. ESA, 2003, 13 pgs.
Antonin Guttman. R-Trees: A Dynamic Index Structure for Spatial Searching. Proceedings of SIGMOD, pp. 47-57, Boston, MA, 1984.
Cho, Hyung-Ju and Chung, Chin-Wan. An efficient and scalable approach to CNN queries in a road network. Proceedings of VLDB, pp. 865-876, Trondheim, Norway, 2005.
Demiryurek et al., "Towards K Nearest Neighbor Search in Time Dependent Spatial Network Databases," 2010, Proceedings of DNIS, 2010, pp. 1-14.
Dimitris Papadias and Jun Zhang and Nikos Mamoulis and Yufei Tao. Query processing in spatial networks. Proceedings of VLDB, pp. 802-813, Berlin, Germany, 2003.
Ding, Bolin and Yu, Jeffrey Xu and Qin, Lu. Finding time-dependent shortest paths over graphs. Proceedings of EDBT, New York, NY, USA, 2008. ACM, pp. 1-12, large graphs.
Dreyfus, P. An appraisal of some shortest path algorithms. Journal of Operation Research 17, NY, USA, 1969., 43 pgs.
George, Betsy and Kim, Sangho and Shekhar, Shashi. Spatio-temporal Network Databases and Routing Algorithms: A Summary of Results. Proceedings of SSTD, 2007, pp. 460-477.
Haibo Hu and Dik Lun Lee and Jianliang Xu. Fast Nearest Neighbor Search on Road Networks. Proceedings of EDBT, pp. 33-40, Toronto, Canada, 2006. , pp. 186-203.
Huang, Xuegang and Jensen, Christian S. and Saltenis, Simonas. The Island Approach to Nearest Neighbor Querying in Spatial Networks. Proceedings of SSTD, pp. 33-40, Toronto, Canada, 2005.
Ismail Chabini. The Discrete-Time Dynamic Shortest Path Problem: Complexity, Algorithms, and Implementations. Journal of Transportation Research Record, 1645, NJ, USA, 1999, pp. 1-9.
J. Halpern. Shortest route with time dependent length of edges and limited delay possibilities in nodes. Journal of Mathematical Methods of Operations Research,21, 1969, pp. 1-8.
Kanoulas, Evangelos and Du, Yang and Xia, Tian and Zhang, Donghui. Finding Fastest Paths on a Road Network with Speed Patterns. Proceedings of ICDE, Washington, USA, 2006, pp. 1-20.
Martin Erwig and Fernuniversitat Hagen. The Graph Voronoi Diagram with Applications. Journal of Networks, 36, 2000, pp. 1-14.
Mohammad Kolandouzan and Cyrus Shahabi. Voronoi-based K NN search in spatial networks. Proceedings of VLDB, pp. 840-851, Toronto, Canada, 2004.
Orda, Ariel and Rom, Raphael. Shortest-path and minimum-delay algorithms in networks with time-dependent edge-length. Journal of the ACM,37, 1990, 27 pgs.
TeleAtlas. http://www.teleatlas.com. Last visited Jan. 2, 2010, 1 pg.
Tomtom, Digital Map Feedback, Home Page, downloaded from the internet at http://licensing.tomtom.com/ForConsumers/MapFeedback/index.htm, on May 2, 2011, 1 page.
Ugur Demiryurek and Bei Pan and Farnoush Banaei Kashani and Cyrus Shahabi. Towards modeling the traffic data on road networks. Proceedings of SIGSPATIAL-IWCTS, 2009, pp. 1-6.
Ulrith Lauther. An Extremely Fast, Exact Algorithm for Finding Shortest Paths in Static Networks with Geographical Background. Geoinformation and Mobilitat, pp. 33-40, Toronto, Canada, 2004.
Wagner, Dorothea and Willhalm,Thomas. Geometric Speed-Up Techniques for Finding Shortest Paths in Large Sparse Graphs. Proceedings of Algorithms-ESA, 2003, 13 pgs.

* cited by examiner

HIERARCHICAL AND EXACT FASTEST PATH COMPUTATION IN TIME-DEPENDENT SPATIAL NETWORKS

CROSS REFERENCE TO RELATED APPLICATIONS

This application claims the benefit of priority from U.S. Provisional application entitled "Hierarchical and Exact Fastest Path Computation in Time-dependent Spatial Networks", filed May 3, 2011, Application Ser. No. 61/482,001, the disclosure of which is incorporated by reference in its entirety.

STATEMENT AS TO FEDERALLY SPONSORED RESEARCH

This invention was made with government support under grant number CNS-0831505 awarded by the National Science Foundation (NSF). The government has certain rights in the invention.

BACKGROUND

This specification relates to path computation in spatial networks.

The problem of point-to-point fastest path computation in spatial networks is extensively studied with many approaches proposed to speed-up the computation. Most of the existing approaches make the simplifying assumption that travel-times of the network edges are constant. With the ever-growing popularity of online map applications and their wide deployment in mobile devices and car-navigation systems, an increasing number of users search for point-to-point fastest paths and the corresponding travel-times. On static road networks where edge costs are constant, this problem has been extensively studied and many efficient speed-up techniques have been developed to compute the fastest path in a matter of milliseconds (e.g., Hanan Samet and Jagan Sankaranarayanan and Houman Alborzi, Scalable Network Distance Browsing in Spatial Databases, SIGMOD, pages 33-40, Toronto, Canada, 2008; Ulrith Lauther, An Extremely Fast, Exact Algorithm for Finding Shortest Paths in Static Networks with Geographical Background, Geoinformation and Mobilitat, pages 33-40, Toronto, Canada, 2004; Wagner, Dorothea and Willhalm, Thomas, Geometric Speed-Up Techniques for Finding Shortest Paths in Large Sparse Graphs, ESA, 2003; P. Sanders and D. Schultes, Highway hierarchies hasten exact shortest path queries, ESA, 2005; and Sanders, Peter and Schultes, Dominik, Engineering fast route planning algorithms, WEA, 2007).

SUMMARY

The static fastest path approaches make the simplifying assumption that the travel-time for each edge of the road network is constant (e.g., proportional to the length of the edge). However, in the real-world, the actual travel-time on a road segment heavily depends on the traffic congestion and, therefore, is a function of time i.e., time-dependent. For example, FIG. 1 shows the variation of travel-time 100 (computed by averaging two-years of historical traffic sensor data) for a particular road segment of the I-10 freeway in Los Angeles as a function of arrival-time to the segment. As shown, the travel-time of this segment changes with time (i.e, the time that one arrives at the segment entry determines the travel-time), and the change in travel-time is significant. For instance, from 8 AM to 9 AM the travel-time of this single segment changes from 32 minutes to 18 minutes (a 45% decrease). By induction, one can observe that the time-dependent edge travel-times yield a considerable change in the actual fastest path between any pair of nodes throughout the day. Specifically, the fastest path between a source and a destination node varies depending on the departure-time from the source. Unfortunately, all those techniques that assume constant edge weights fail to address the fastest path computation in real-world time-dependent spatial networks.

In general, an aspect of the subject matter described in this specification can be embodied in a method that includes the actions of: partitioning a road network graph into subgraphs, wherein the road network graph has associated time-dependent edge weights; for each one of the subgraphs, which includes interior nodes and border nodes, determining a minimum lower-bound fastest path cost between the border nodes and the interior nodes of the one subgraph, based on minimum edge weight values in the one subgraph; for each pair of the subgraphs, determining a minimum lower-bound fastest path cost between respective border nodes of the pair of subgraphs, based on minimum edge weight values between the pair of subgraphs; finding a path between a first node in a first of the subgraphs and a second node in a second of the subgraphs using a search directed in accordance with a lower-bound estimator of travel time, the lower-bound estimator being the minimum lower-bound fastest path cost between the border nodes and the interior nodes of the first subgraph, the minimum lower-bound fastest path cost between respective border nodes of the first and second subgraphs, and the minimum lower-bound fastest path cost between the border nodes and the interior nodes of the second subgraph.

These and other embodiments can optionally include one or more of the following features. The search can include a first search and a second search, and the finding can include: running the first search for the road network graph in a forward direction, directed in accordance with the lower-bound estimator of travel time, with the time-dependent edge weights taken into consideration; and running, concurrently with the first search, the second search for the road network graph in a backward direction, directed in accordance with the lower-bound estimator of travel time, with minimum possible travel times substituted for the time-dependent edge weights; wherein, after search frontiers of the first and second searches meet, results of the second search limit nodes to be explored by the first search to find a fastest path. The partitioning can include partitioning the road network graph into the subgraphs based on predefined edge class information for the road network graph. In addition, determining the minimum lower-bound fastest path cost between the border nodes and the interior nodes of the one subgraph can include: determining a minimum lower-bound fastest path cost to any of the border nodes of the one, subgraph for each of the interior nodes of the one subgraph; and determining a minimum lower-bound fastest path cost to any of the interior nodes of the one subgraph for each of the border nodes of the one subgraph.

The partitioning can include partitioning the road network graph into a hierarchy of levels of the subgraphs, the finding can include beginning the search at a first level of the hierarchy and then exploring the hierarchy levels in ascending order, and the method can further include: for each of multiple transit nodes connecting adjacent levels of the hierarchy, precomputing a core region and an extended region around the transit node based on lower-bound and upper-bound graphs corresponding to the road network graph; and identifying one of the multiple transit nodes through which to start searching an adjacent higher level of the hierarchy using the core regions and the extended regions for the transit nodes. The precomputing can include, for each one of the multiple transit nodes, determining the core region by: expanding a fastest path tree from the one transit node using upper-bound travel-time; expanding fastest path trees from remaining ones of the transit nodes using lower-bound travel-times; and stopping expansion of the fastest path tree from the one transit node when it meets the fastest path trees from the remaining ones of the transit nodes. Furthermore, the precomputing can include, for each one of the multiple transit nodes, determining the extended region by: expanding a fastest path tree from the one transit node using lower-bound travel-time; expanding fastest path trees from remaining ones of the transit nodes using upper-bound travel-times; and stopping expansion of the fastest path tree from the one transit node when it meets the fastest path trees from the remaining ones of the transit nodes.

The identifying can Include, for a given node in a first level of the hierarchy: checking the core regions for one such core region having the given node inside; if the one such core region is found, identifying the corresponding transit node as the one of the multiple transit nodes through which to start searching the adjacent higher level of the hierarchy; and if the one such core region is not found, determining a subset of the extended regions that have the given node inside, and if the subset contains only one extended region, identifying the corresponding transit node for the one extended region as the one of the multiple transit nodes through which to start searching the adjacent higher level of the hierarchy, else, identifying a closest transit node, from the transit nodes corresponding to the extended regions of the subset, as the one of the multiple transit nodes through which to start searching the adjacent higher level of the hierarchy. Finally, the method can also include providing a user interface including an element that allows selection of a new departure time, after receipt of a query indicating the first node and the second node, to revise the path found between the first node and the second node based on the new departure time.

The described and claimed methods can be implemented using a computer program encoded on a computer-readable medium or in a larger computer system (e.g., an online mapping and direction finding server system). Thus, according to another aspect of the subject matter described in this specification, a computer-readable medium encodes a computer program product operable to cause data processing apparatus to perform operations in accordance with any of the method claims; and a system can include: a user interface device; and one or more computers that interact with the user interface device, the one or more computers including at least one processor and at least one memory device, where the one or more computers are configured and arranged to perform operations in accordance with any of the method claims.

According to another aspect of the subject matter described in this specification, a computer-readable medium encodes a computer program product operable to cause data processing apparatus to perform operations including: partitioning a road network graph into subgraphs, wherein the road network graph has associated time-dependent edge weights; for each one of the subgraphs, which includes interior nodes and border nodes, determining a minimum lower-bound fastest path cost to any of the border nodes for each of the interior nodes, and determining a minimum lower-bound fastest path cost to any of the interior nodes for each of the border nodes; for each pair of the subgraphs, determining a minimum lower-bound fastest path cost between any two border nodes of the pair; finding a path between a first node in a first of the subgraphs and a second node in a second of the subgraphs using a search directed in accordance with a lower-bound estimator of travel time, the lower-bound estimator being the minimum lower-bound fastest path cost from the first node to a border node of the first subgraph, the minimum lower-bound fastest path cost between any two border nodes of the first and second subgraphs, and the minimum lower-bound fastest path cost from a border node of the second subgraph and the second node. This aspect can also be implemented as a system or a method, and these and other embodiments can optionally include one or more of the method features addressed above.

According to another aspect of the subject matter described in this specification, a system includes: a user interface device; and one or more computers that interact with the user interface device, the one or more computers including at least one processor and at least one memory device, the one or more computers configured and arranged to partition a road network, having associated time-dependent edge weights, into a hierarchy of levels for use in finding a path between nodes of the road network, where the finding includes beginning a search at a first level of the hierarchy and then exploring the hierarchy levels in ascending order, and the one or more computers configured and arranged to, for each of multiple transit nodes connecting adjacent levels of the hierarchy, precomputer a core region and an extended region around the transit node based on lower-bound and upper-bound graphs corresponding to the road network graph, and identify one of the multiple transit nodes through which to start searching an adjacent higher level of the hierarchy using the core regions and the extended regions for the transit nodes. This aspect can also be implemented as a method or a computer-readable medium, and these and other embodiments can optionally include one or more of the method features addressed above.

In addition, in system implementations, the one or more computers can include a server operable to interact with the user interface device through a data communication network, and the user interface device can be operable to interact with the server as a client. The user interface device can include a mobile phone or satellite navigation device. Finally, the one or more computers include be one personal computer, and the personal computer can include the user interface device.

DETAILED DESCRIPTION

Figure 1:
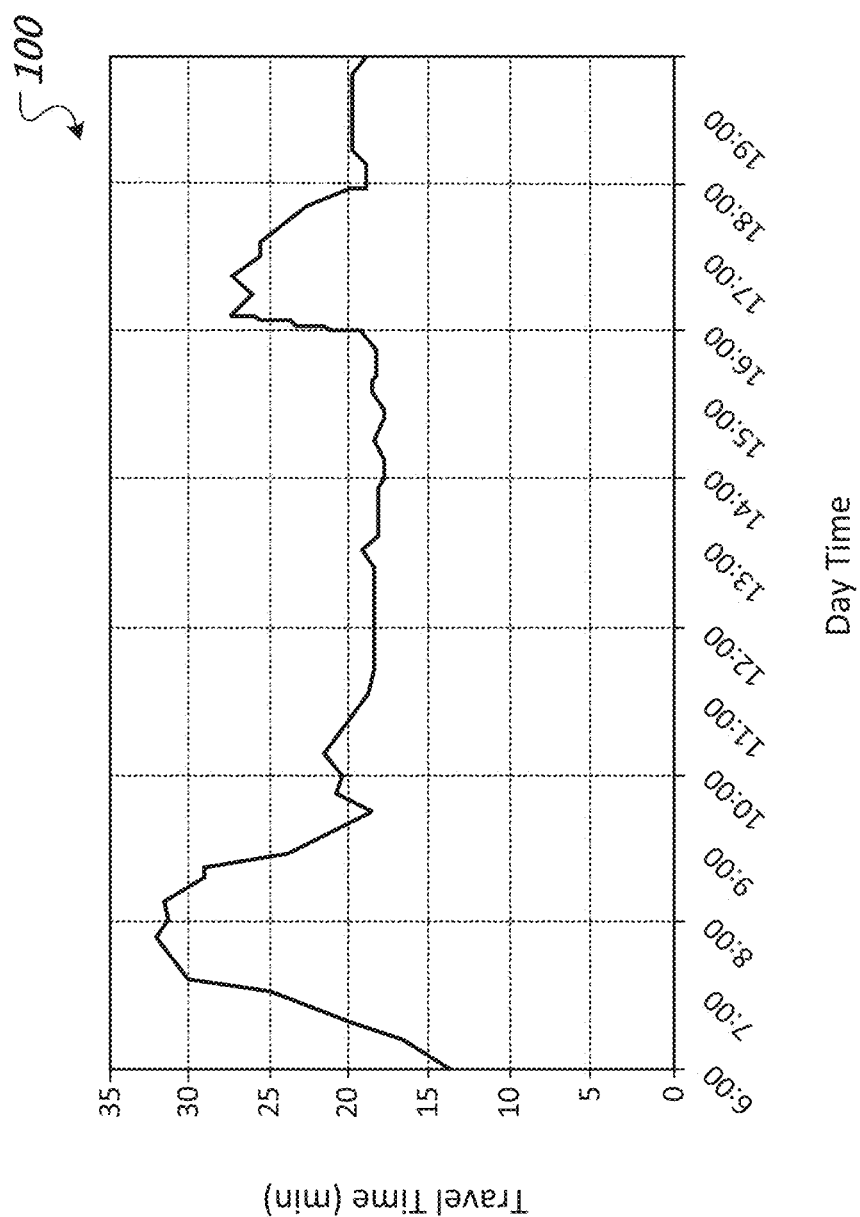
FIG. 1 shows the real-world travel-time pattern on a segment of I-10 freeway in Los Angeles between 6 AM and 8 PM on a weekday.

Section 1—Towards Time-dependent Path Planning: To illustrate why classic fastest path computations in static road networks may return non-optimal results, we show a simple example in FIG. 2 where a spatial network is modeled as a time-dependent graph 200 and edge travel-times are function of time. Consider the snapshot of the network (i.e., a static network) with edge weights corresponding to travel-time values at t=0. With classic fastest path computation approaches that disregard time-dependent edge travel-times, the fastest path from s to d goes through $v_1$, $v_2$, $v_4$ with a cost of 13 time units. However, by the time when $v_2$ is reached (i.e., at t=5), the cost of edge e($v_2$, $v_4$) changes from 8 to 12 time units, and hence reaching d through $v_2$ takes 17 time units instead of 13 as it was anticipated at t=0. In contrast, if the time-dependency of edge travel-times are considered and hence the path going through $v_3$ was taken, the total travel-cost would have been 15 units which is the actual optimal fastest path. We call this shortcoming of the classic fastest path computation techniques as no-lookahead problem. Unfortunately, most of the existing state of the art path planning applications (e.g., Google Maps, Bing Maps) suffer from the no-lookahead shortcoming and, hence, their fastest path recommendation remains the same throughout the day regardless of the departure-time from the source e.g., query time). Although some of these applications provide alternative paths under traffic conditions (which may seem similar to time-dependent planning at first), we observe that the recommended alternative paths and their corresponding travel-times still remain unique during the day, and hence no time-dependent planning is actually performed. To the best of our knowledge, these applications compute top-k fastest paths (i.e., k alternative paths) and their corresponding travel-times with and without taking into account the traffic conditions. The travel-times which take into account the traffic conditions are simply computed by considering increased edge weights (that corresponds to traffic congestion) for each path. However, our time-dependent path planning results in different optimum paths for different departure-times from the source. For example, consider FIG. 3A where Google Maps offer two alternative paths 310 and 320 (and their travel-times under no-traffic and traffic conditions) for an origin and destination pair in the Los Angeles road network. Note that the path recommendation and the travel-times remain the same regardless of when the user submits the query. On the other hand, FIGS. 3B-3H depict the time-dependent path recommendations for the same origin and destination pair where we computed the time-dependent fastest paths for 38 consecutive departure-times between 8 AM and 5:30 PM, spaced 15 minutes apart (note that the paths are computed using the algorithm presented in Section 4 below, where time-dependent edge travel-times are generated based on the two-years of historical traffic sensor data collected from Los Angeles road network).

As shown, the optimal paths change frequently during the course of the day. Moreover, the user interface can include an element that allows selection of a departure time (or a departure time range) either with the initial query submission or after the query submission. Thus, for example, after a source and destination have been set by a query and a fastest path shown to the user (where the departure time can be assumed to be the time the query is received or can be set to a time specified with the query submission), a time slider 350 can be used to change the departure time, and the user interface can be actively updated with a new fastest path in response to changing of the departure time. Furthermore, in some implementations, a departure time range can be specified, and more than one path can be shown in the user interface at once, with the various paths being associated with sub-portions of the time range (e.g., by color coding or by different line patterns).

One may argue against the benefits time-dependent path planning algorithms due to a) unavailability of the time-dependent edge travel-times, or b) negligible gain of time-dependent path planning (i.e., how much time-dependent planning can improve the travel-time) over the static path planning. To address the first argument, note that recent advances in sensor networks enabled instrumentation of road networks in major cities for collecting real-time traffic data, and hence it is now feasible to accurately model the time-dependent travel-times based on the vast amounts of historical data. For instance, at our research center, we maintain a very large traffic sensor dataset of Los Angeles County that we have been collecting and archiving the data for over two years see Section 6.1 for the details of this dataset). As another example, the PeMS project developed by UC Berkeley generates time-varying edge travel-times using historical traffic sensor data throughout California. Meanwhile, we also witness that leading navigation service providers (such as Navteg and TeleAtlas) have already started releasing their time-dependent travel-time datasets for road networks at high temporal resolution (e.g., one sample for every five minutes). With regards to the second argument, several recent research studies showed the importance of time-dependent path planning in road networks where real-world traffic datasets have been used for the assessment. For example, in Ugur Demiryurek and Famoush Banaei Kashani and Cyrus Shahabi, A Case for Time-dependent Shortest Path Computation in Spatial Networks, ACM SIGSPATIAL, 2010, the authors report that the fastest path computation that considers time-dependent edge travel-times in Los Angeles road network decreases the travel-time by as much as 68% over the fastest path computation that assumes constant edge travel-times. A similar observation was made in another study, Baris Guc and Anand Ranganatlian, Real-time, Scalable Route Planning using Stream-Processing Infrastructure, ITS, NJ, USA, 2010, where the time-dependent fastest path computation in a Stockholm road network can improve the travel-time accuracy up to 62%. Considering the availability of high-resolution time-dependent travel-time data for road networks, and the importance of time-dependency for accurate and useful path planning, the need for efficient algorithms to enable next-generation time-dependent path planning applications becomes apparent and immediate.

The time-dependent fastest path problem was first shown by Dreyfus (Stuart E. Dreyfus, An Appraisal of Some Shortest-Path Algorithms, Operations Research Vol. 17, No. 3, 1969) to be polynomially solvable in FIFO (First-In-First-Out) networks by a trivial modification to Dijkstra algorithm where, analogous to shortest path distances, the arrival-time to the nodes is used as the labels that form the basis of the greedy algorithm. The FIFO property, which typically holds for many networks including road networks, suggests that moving objects exit from an edge in the same order they entered the edge. However, the modified Dijkstra algorithm is far too slow for online map applications which are usually deployed on very large networks and require almost instant response times. On the other hand, there are many efficient precomputation approaches that answer fastest path queries in near real-time (e.g., Hanan Samet and Jagan Sankaranarayanan and Houman Alborzi, Scalable Network Distance Browsing in Spatial Databases, SIGMOD, pages 33-40, Toronto, Canada, 2008) in static road networks. However, it is infeasible to extend these approaches to time-dependent networks. This is because the input size (i.e., the number of fastest paths) increases drastically in time-dependent networks. Specifically, since the length of a s-d path changes depending on the departure-time from s, the fastest path is not unique for any pair of nodes in time-dependent networks. It has been conjectured in Dean, Brian C., Algorithms for mincost paths in time-dependent networks with wait policies, Networks, NJ, USA, 2004, that the number of fastest paths between any pair of nodes in time-dependent road networks can be super-polynomial. Hence, an algorithm which considers every possible path (corresponding to every possible departure-time from the source) for any pair of nodes in large time-dependent networks would suffer from exponential time and prohibitively large storage requirements. For example, the time-dependent extension of Contraction Hierarchies (CH) (Gernot Veit Batz and Daniel Delling and Peter Sanders and Christian Vetter, Time-Dependent Contraction Hierarchies, ALENEX, 2009) and SHARC (Delling, Daniel, Time-Dependent SHARC-Routing, ESA, 2008) speed-up techniques (which are proved to be very efficient for static networks) suffer from the impractical precomputation times and intolerable storage complexity see Section 2). The time-dependent ALT (Daniel Delling and Dorothea Wagner, Landmark-based routing in dynamic graphs, WEA, 2007) approach (also originally developed for static networks) is more efficient than the time-dependent CH and SHARC. However, with ALT the search space is severely affected by the selection of the landmarks. So far no optimal strategy with respect to landmark selection and random queries has been found, and hence ALT does not guarantee to yield the small search spaces with respect to fastest path computations where source and destination nodes are chosen at random. We show that our proposed (exact) solution outperforms time-dependent ALT by a factor of at least four in storage and response time (see Section 6.2).

In this study, we present two different techniques, one exact and one approximate, for online computation of fastest path in large time-dependent road networks. For both of our approaches, we precompute and leverage two time-independent auxiliary graphs corresponding to the time-dependent network graph G, namely the lower-bound graph ($\underline{G}$) and the upper-bound graph ($\overline{G}$). To construct $\underline{G}$ and $\overline{G}$ substitute the edge travel-times in G with minimum and maximum possible travel-times, respectively. The lower-bound and upper-bound graphs are extremely efficient in pruning the search space for both exact and approximate fastest path computation in time-dependent networks. For our exact fastest path computation technique, we propose a bidirectional time-dependent fastest path algorithm (B-TDFP) based on A* search (Hart, Peter and Nilsson, Nils and Raphael, Bertram, A Formal Basis for the Heuristic Determination of Minimum Cost Paths, IEEE Transactions on Systems Science and Cybernetics, 1968). There are two main challenges to employ bidirectional A* search in time-dependent networks. First, it is generally not possible to implement a backward search without knowing the arrival-time at the destination. Second, finding an admissible heuristic function (i.e., lower-bound distance) between an intermediate $v_i$ node and the destination d is challenging as the distance between $v_i$ and d changes based on the departure-time from $v_i$. We address the former challenge by running the backward search on $\underline{G}$ which enables us to filter-in the set of the nodes that are explored by the forward search. To address the latter challenge, we partition the road network to non-overlapping partitions (an off-line operation) and precompute the intra (border-to-border) and inter (node-to-border) partition distance labels with respect to $\underline{G}$. We use the combination of intra and inter distance labels as a heuristic function in the online computation. Our experiments showed that B-TDFP is approximately one order of magnitude faster than the time-dependent Dijkstra algorithm.

In our second approach, we develop a hierarchical path finding technique (H-TDFP) for an approximate computation of fastest path. Our motivation is based on the fact that, given the source and destination nodes are sufficiently, far away, humans tend to select paths hierarchically, i.e., drive on a local road which connects to freeway, drive on the freeway to a location nearby the destination, exit freeway and reach the destination via local road. The hierarchical path may not necessarily be the optimal but largely considered as the best path as the higher level road segments offer uninterrupted (e.g., smaller number of turns, no traffic lights travel. With H-TDFP, we start the path search at the first level and then carry out exploring the hierarchy in the network in ascending order. Since the number of nodes at each level shrinks rapidly, the total number of explored nodes is considerably smaller than that of the plain fastest path algorithm. Hence, our solution strikes a compromise between the computation time and the optimality of the fastest path. The main challenge with hierarchical path planning in time-dependent networks is the time it takes to identify the transit node through which we start searching the adjacent higher levels. We address this challenge by precomputing two subnetworks around each transit node called Core Region (CR) and Extended Region (ER) based on the lower-bound and upper-bound graphs, respectively. We compute CRs and ERs by extending a method described in U.S. patent application Ser. No. 13/278, 060, filed Oct. 20, 2011, which is hereby incorporated by reference, that has been proposed to find k nearest neighbors in time-dependent road networks. The CRs and ERs enable us to find the best transit node by executing either none or very limited number of fastest path computation. Our experiments show that H-TDFP yields more than one orders of magnitude reduction (as compared to B-TDFP) in the computation time at the expense of only 7% increase in the path travel-time as compared to the optimal solution. To the best of our knowledge, our proposed approach is the first hierarchial path planning solution in time-dependent road networks.

The remainder of this paper is organized as follows. In Section 2, we review the related work on time-dependent fastest path algorithms. In Section 3, we formally define the time-dependent fastest path problem in spatial networks. In Section 4, we establish the theoretical foundation of our proposed bidirectional algorithm and explain our approach. In Section 5, we introduce our hierarchial time-dependent fastest path algorithm. In Section 6, we present the results of our experiments for both approaches with a variety of spatial networks with real-world time-dependent edge weights. Finally, in Section 7, we conclude and discuss our future work.

Section 2—Related Work: In this section, we review previous studies on time-dependent fastest path (TDFP) computation. In the last decade, numerous efficient fastest path algorithms with precomputation methods have been proposed (see Sanders, Peter and Schultes, Dominik, Engineering fast route planning algorithms, WEA, 2007, and Hanan Samet and Jagan Sankaranarayanan and Houman Alborzi, Scalable Network Distance Browsing in Spatial Databases, SIGMOD, pages 33-40, Toronto, Canada, 2008, for an overview). However, there is a limited number of studies for efficient computation of time-dependent fastest path problem.

Cooke and Halsey first studied the time-dependent fastest path problem where they solved the problem by formulating it in discrete-time and using Dynamic Programming (see L. Cooke and E. Halsey, The shortest route through a network with timedependent internodal transit times, Journal of Mathematical Analysis and Applications, NJ, LISA, 1966). Another discrete-time solution to TDFP problem is to utilize time-expanded networks (see Ekkehard Köhler and Katharina Langkau and Martin Skutella, Time-Expanded Graphs for Flow-Dependent Transit Times, Proc. 10th Annual European Symposium on Algorithms, 2002). In general, time-expanded network and discrete-time approaches assume that the edge weight functions are defined over a finite discrete window of time t∈$t_0, t_1, \ldots, t_n$, where $t_n$ is determined by the total duration of time interval under consideration. Therefore, the problem is reduced to the problem of computing minimum-weight paths over a static network per time window. Hence, one can apply any of the well-known static fastest path algorithms. Although these algorithms are easy to design and implement, they have numerous shortcomings. First, time-expanded models would need to create a separate instance of the network for each time instance hence yielding a substantial amount of storage overhead. Second, such approaches can only provide approximate results because the model misses the state of the network between any two discrete-time instants. Moreover, the difference between the shortest path obtained using the time-expanded model and the optimal shortest path is very sensitive to the parameter n (i.e., number of intervals) and is unbounded. This is because the query time can be always between any two of the intervals which are not captured by the model, and hence the error is accumulated on each edge along the path. Finally, it is very hard to decide on the effective choice of discrete-time intervals for real-world applications. In George, Betsy and Kim, Sangho and Shekhar, Shashi, Spatio-temporal Network Databases and Routing Algorithms: A Summary of Results, SSTD, 2007, George and Shekhar proposed a time-aggregated graph approach where they aggregate the travel-times of each edge over the time instants into a time series. Even though their model requires less space than that of the time-expanded networks, the results are still approximate with no bounds.

In Stuart E. Dreyfus, An Appraisal of Some Shortest-Path Algorithms, Operations Research Vol. 17, No. 3, 1969, Dreyfus showed that the time-dependent fastest problem can be solved by a generalization of Dijkstra's method as efficiently as for static fastest path problems. However, Halpern proved (in J. Halpern, Shortest route with time dependent length of edges and limited delay possibilities in nodes, Mathematical Methods of Operations Research, 1969) that the generalization of Dijkstra's algorithm is only true for FIFO networks. If the FIFO property does not hold in a time-dependent network, then the problem is NP-Hard. In Orda, Ariel and Rom, Raphael, Shortest-path and minimum-delay algorithms in networks with time-dependent edge-length, J. ACM, 1990, Orda and Rom introduced a time-dependent fastest path approach based on Bellman-Ford algorithm. With their approach, they determine the path toward destination by refining the arrival-time functions on each node in the whole time interval T. In Kanoulas, Evangelos and Du, Yang and Xia, Tian and Zhang, Donghui, Finding Fastest Paths on A Road Network with Speed Patterns, ICDE, Washington, USA, 2006, Kanoulas et al. introduced a Time-Interval All Fastest Path (allFP) approach in which they maintain a priority queue of all paths to be expanded instead of sorting the priority queue by scalar values. Therefore, they enumerate all the paths from the source to a destination node which incurs exponential running time in the worst case. In Ding, Bolin and Yu, Jeffrey Xu and Qin, Lu, Finding time-dependent shortest paths over large graphs, EDBT, New York, N.Y., USA, 2008 ACM, Ding et al. used a variation of Dijkstra's algorithm to solve the TDFP problem. With their TDFP algorithm, using Dijkstra like expansion, they decouple the path-selection and time-refinement (computing earliest arrival-time functions for nodes) for a given starting time interval T. Their algorithm is also shown to run in exponential time for special cases (see Dehne, Frank and Omran, Masoud T. and Sack, Jörg-Rüdiger, Shortest paths in time-dependent FIFO networks using edge load forecasts, IWCTS, 2009). The focus of both Kanoulas, Evangelos and Du, Yang and Xia, Tian and Zhang, Donghui, Finding Fastest Paths on A Road Network with Speed Patterns, ICDE, Washington, USA, 2006 and Ding, Bolin and Yu, Jeffrey Xu and Qin, Lu, Finding time-dependent shortest paths over large graphs, EDBT, New York, N.Y., USA, 2008 ACM is to find the fastest path in time-dependent road networks for a given start time interval (e.g., between 7:30 AM and 8:30 AM).

The ALT algorithm (Andrew V. Goldberg and Chris Harellson, Computing the Shortest Path: A* Search Meets Graph Theory, SODA, pages 422-432, 2005) was originally proposed to accelerate fastest path computation in static road networks. With this approach, a set of nodes called landmarks are chosen and then the shortest distances (in travel-time) between all the nodes in the network and all the landmarks are computed and stored. ALT employs triangle inequality based on distances to the landmarks to obtain a heuristic function to be used in A* search. The time-dependent variant of this technique is studied in Daniel Defling and Dorothea Wagner, Landmark-based routing in dynamic graphs, WEA, 2007, where heuristic function is computed with respect to a lower-bound graph. However, with ALT, the landmark selection is very difficult (relies on heuristics) and the size of the search space is severely affected by the choice of landmarks. So far no optimal strategy with respect to landmark selection and random queries has been found. Specifically, landmark selection is NP-hard (see Potamias, Michalis and Bonchi, Francesco and Castillo, Carlos and Gionis, Aristides, Fast shortest path distance estimation in large networks, CIKM, 2009) and ALT does not guarantee to yield the smallest search spaces with respect to fastest path computations where source and destination nodes are chosen at random. Our experiments with real-world time-dependent travel-times show that our exact approach consumes much less storage as compared to ALT and yields faster response times (see Section 6). In two different studies. The Contraction Hierarchies (CH) and SHARC methods (also developed for static networks) were augmented to time-dependent road networks. The main idea of these techniques is to remove unimportant nodes from the graph without changing the fastest path distances between the remaining (more important) nodes. However, unlike the static networks, the importance of a node can change throughout the time under consideration in time-dependent road networks, hence the importance of the nodes are time varying. Considering the super-polynomial input size (as discussed in Section 1), and hence the super-polynomial number of important nodes with time-dependent networks, the main shortcomings of these approaches are impractical preprocessing times and extensive space consumption. For example, the precomputation time for SHARC in time-dependent road networks takes more than two days for relatively small road networks (e.g. Germany). While CH also suffers from slow preprocessing times, the space consumption for CH is at least 1000 bytes per node for less varied edge-weights (e.g., weekend travel time patterns) where the storage cost increases with real-world time-dependent edge weights. Therefore, it is not feasible to apply SHARC and CH to continental size road networks which can consist of up to 45 million road segments (e.g., North America road network) with possibly large varied edge-weights.

Figure 2:
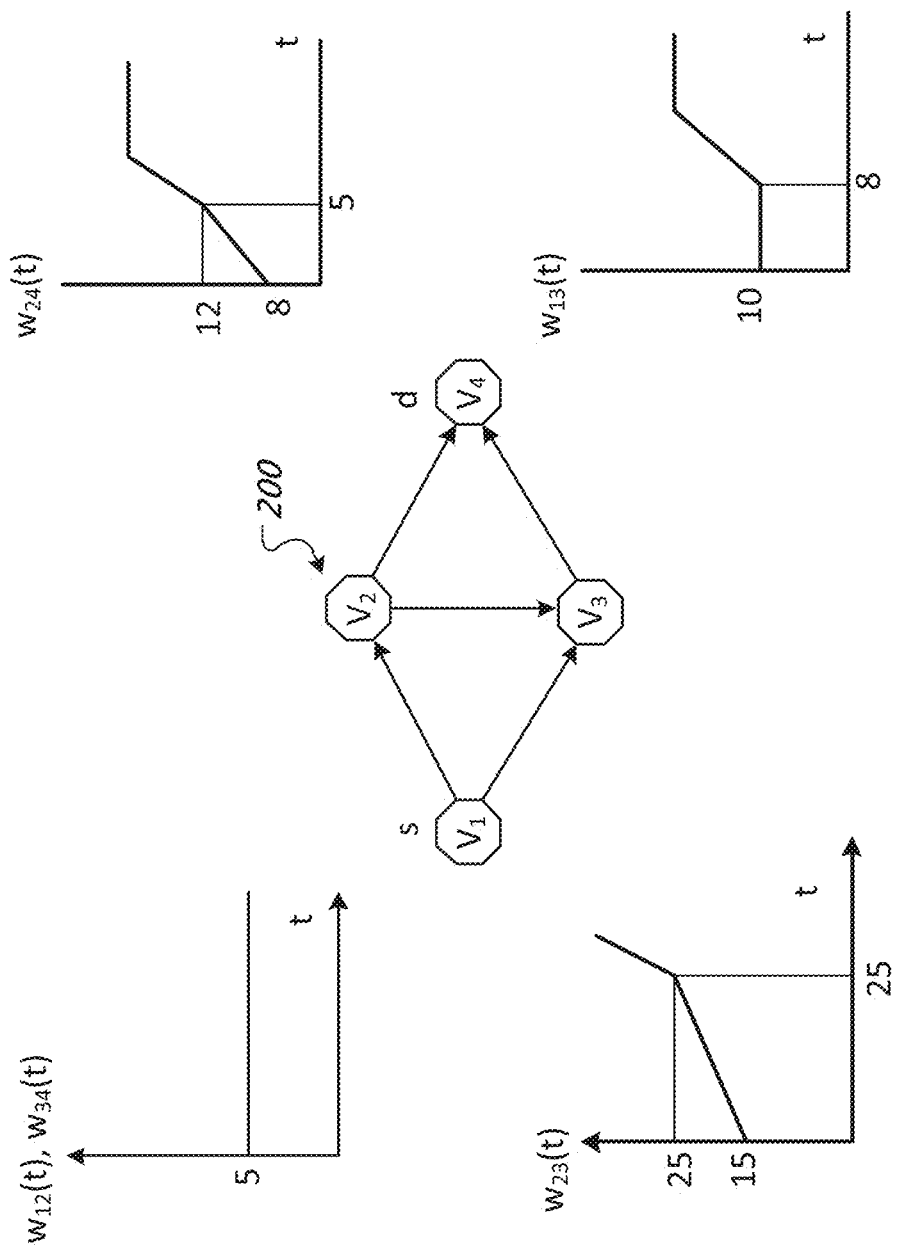
FIG. 2 shows a spatial network modeled as a time-dependent graph in which edge travel-times are function of time.
Figure 3A:
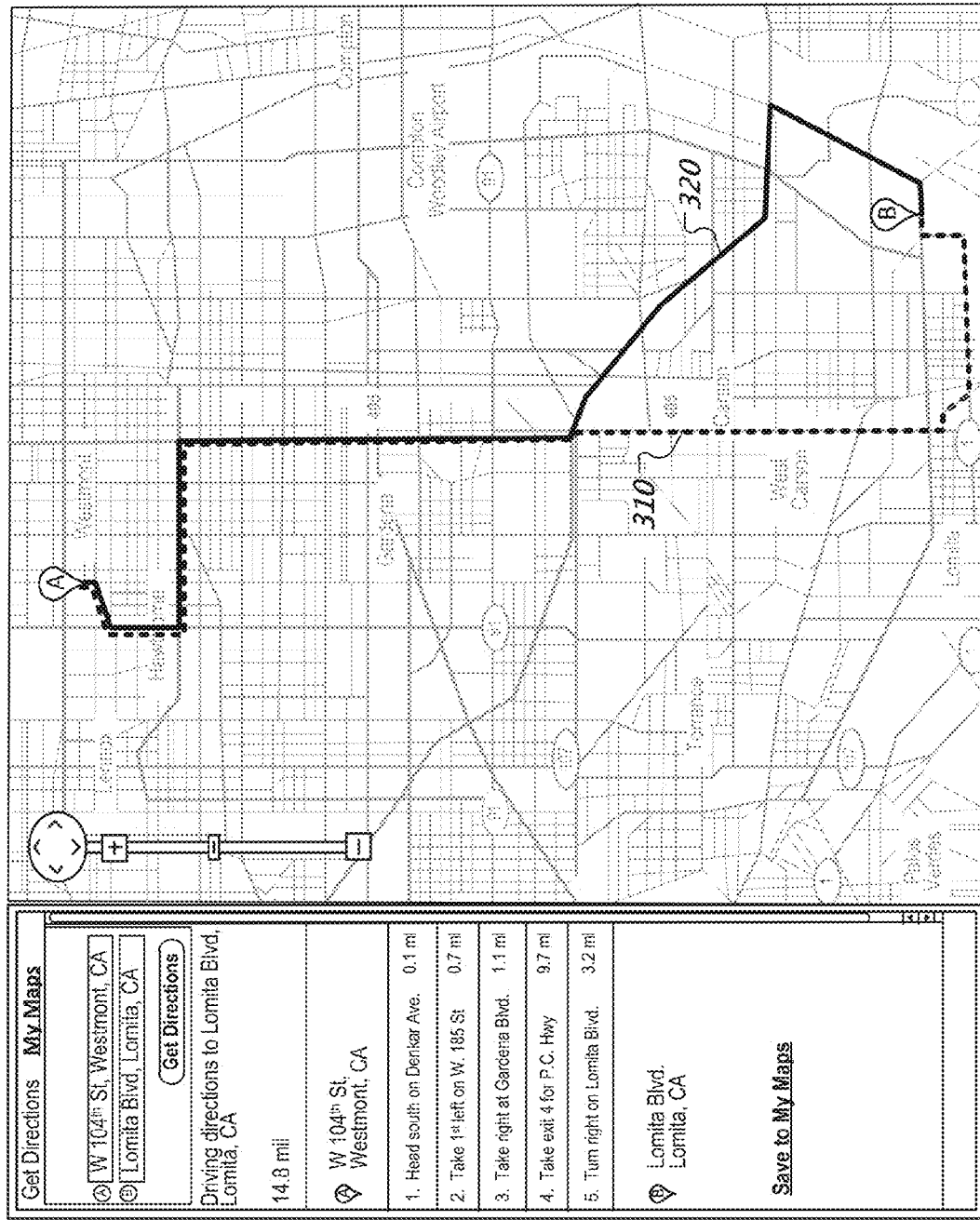
FIG. 3A shows Google Maps offering two alternative paths for an origin and destination pair in the Los Angeles road network.
Figure 3B:
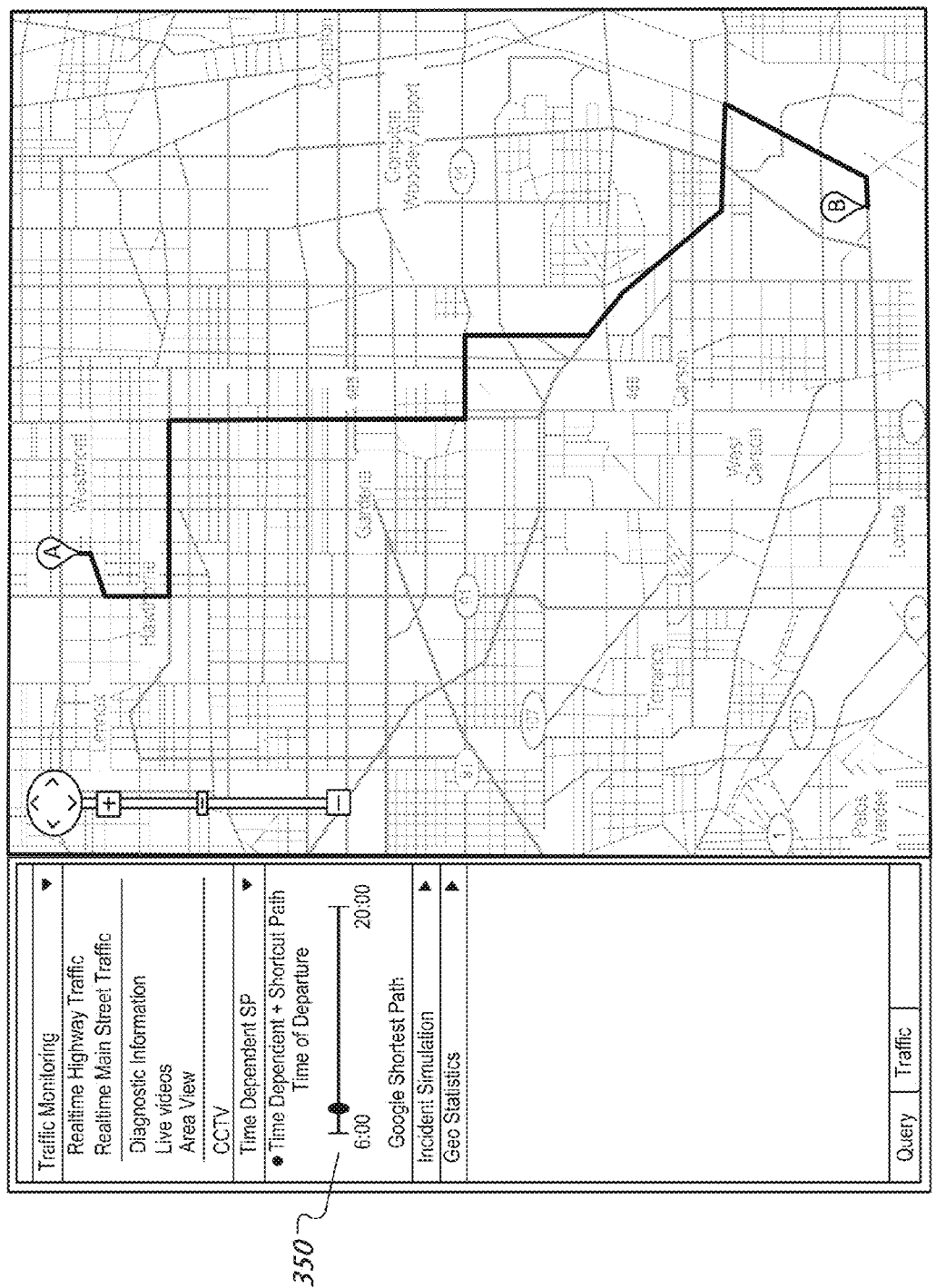
FIGS. 3B-3H show the time-dependent path recommendations for the same origin and destination pair computed using different departure times.
Figure 3C:
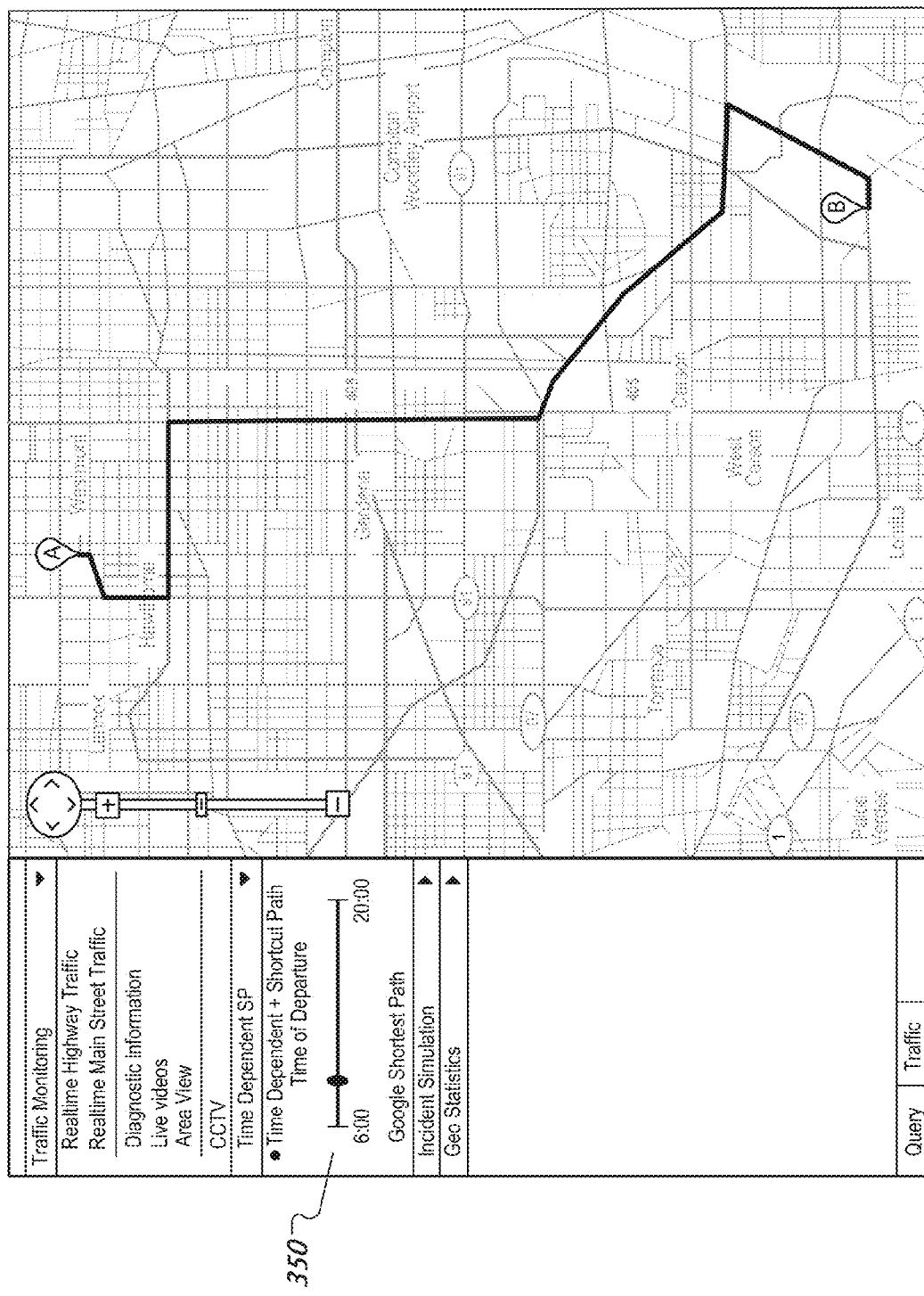
Figure 3D:
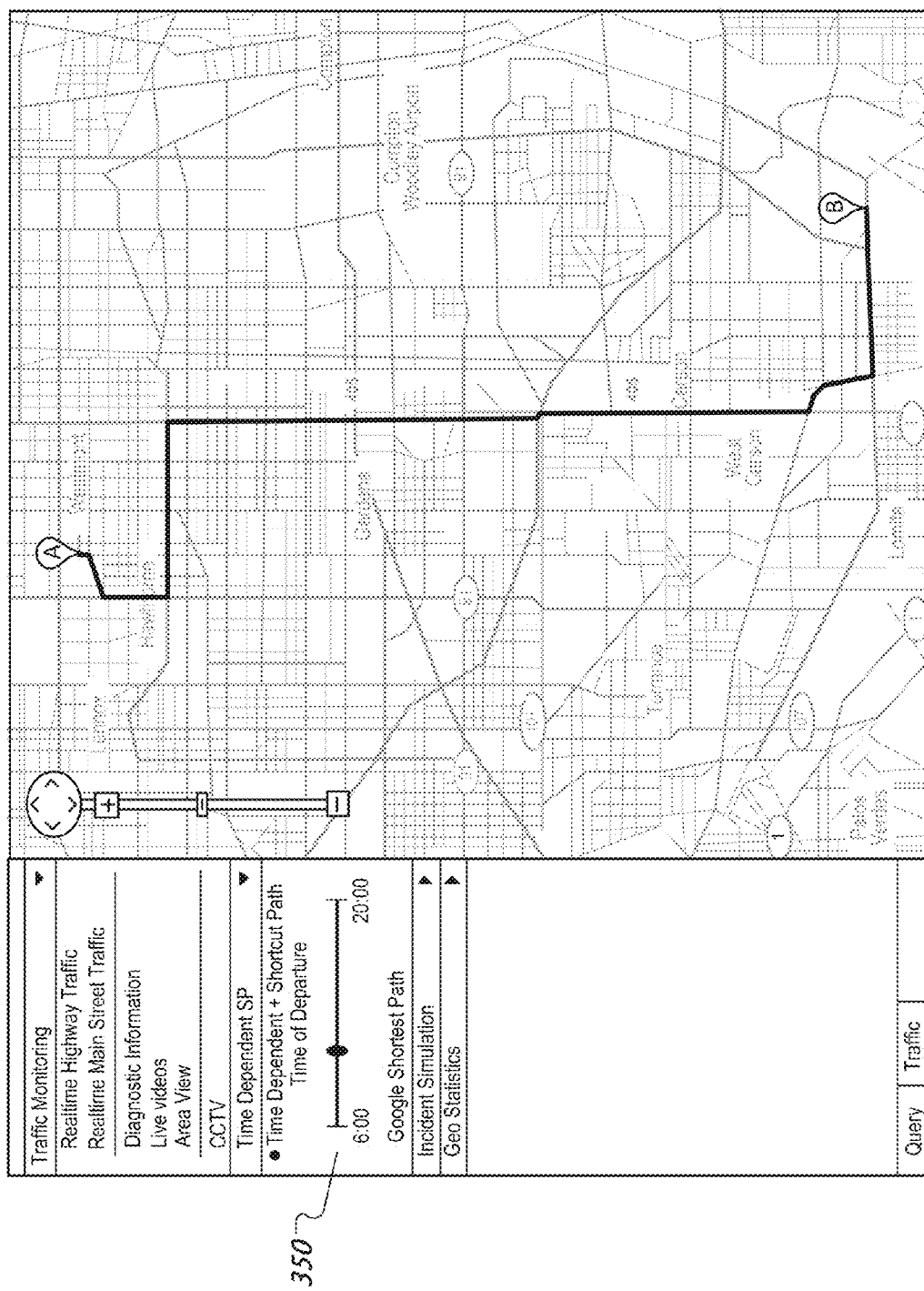
Figure 3E:
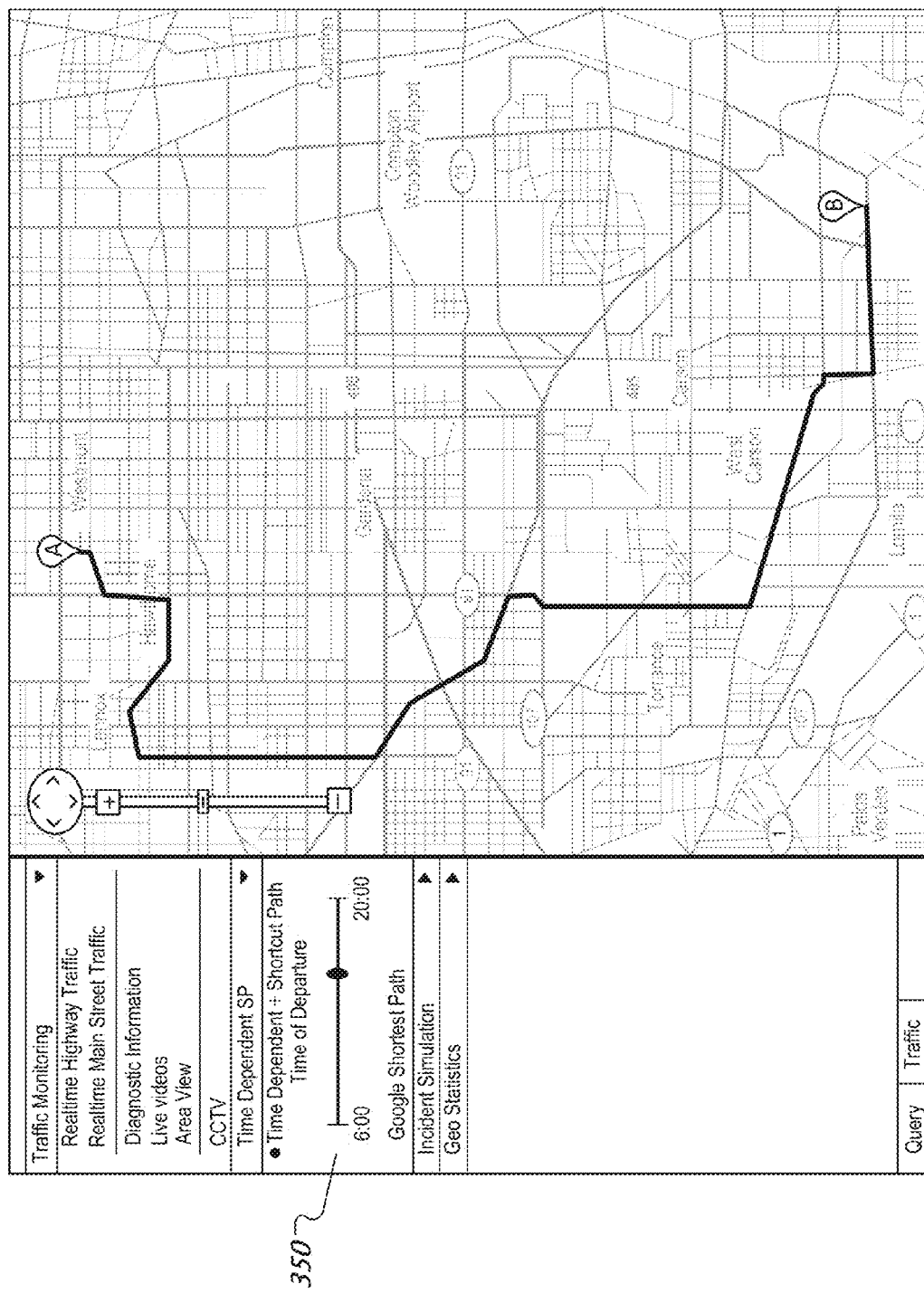
Figure 3F:
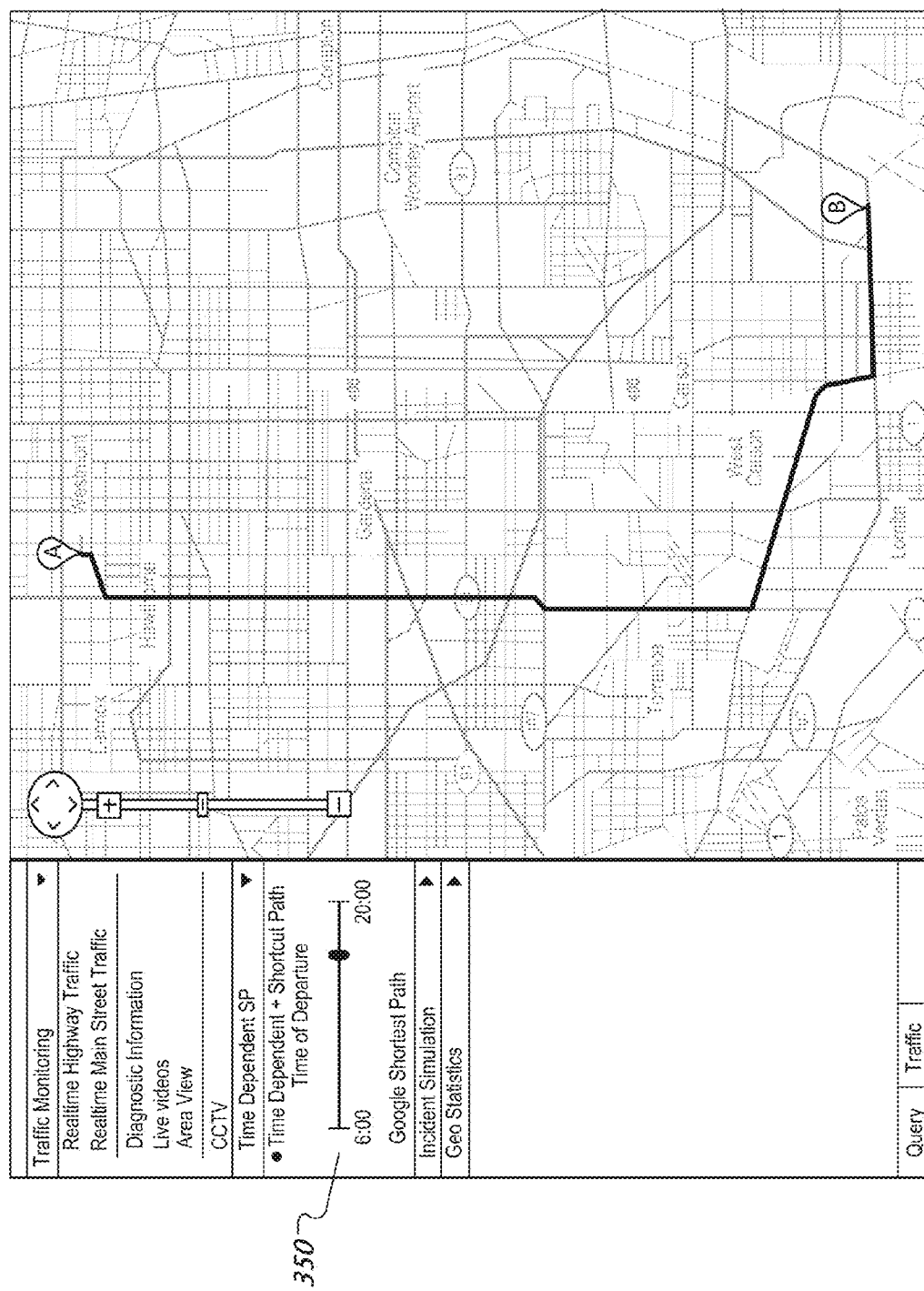
Figure 3G:
Figure 3H:
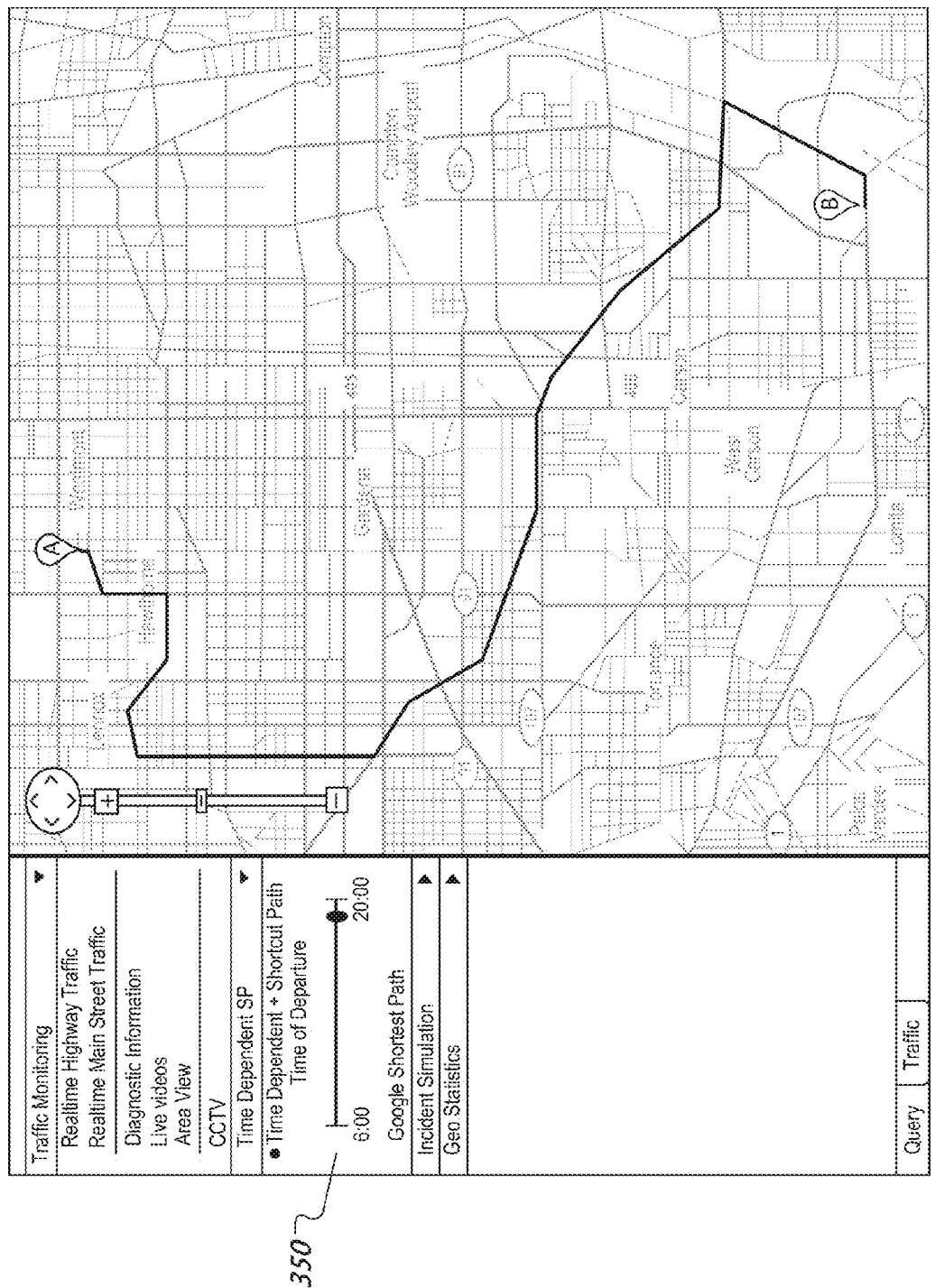

Section 3—Problem Definition: There are various criteria to define the cost of a path in road networks. In our study we define the cost of a path as its travel-time. We model the road network as a time-dependent weighted graph as shown in FIG. 2 where the non-negative time-dependent travel-times are provided as a function of time which captures the typical congestion pattern for each segment of the road network. We use piecewise linear functions to represent the time-dependent travel-times in the network.

Definition 1. Time-dependent Graph. A Time-dependent Graph is defined as $G(V,E,T)$ where $V=\{v_i\}$ is a set of nodes and $E \subseteq V \times V$ is a set of edges representing the network segments each connecting two nodes. For every edge $e(v_i,v_j) \in E$, and $v_i \neq v_j$, there is a cost function $c_{v_i,v_j}(t)$, where t is the time variable in time domain T. An edge cost function $c_{v_i,v_j}(t)$ specifies the travel-time from $v_i$ to $v_j$ starting at time t.

Definition 2. Time-dependent Travel Cost. Let $\{s=v_1, v_2, \ldots, v_k=d\}$ denotes a path which contains a sequence of nodes where $e(v_i, v_{i+1}) \in E$ and $i=1, \ldots, k-1$. Given a $G(V,E,T)$, a path $(s \rightsquigarrow d)$ from source s to destination d, and a departure-time at the source $t_s$, the time-dependent travel cost $TT(s \rightsquigarrow d, t_s)$ is the time it takes to travel the path. Since the travel-time of an edge varies depending on the arrival-time to that edge, the travel-time of a path is computed as follows:

$$TT(s \rightsquigarrow d, t_s) = \sum_{i=1}^{k-1} c_{v_i,v_{i+1}}(t_i) \text{ where}$$

$$t_1 = t_s, t_{i+1} = t_i + c_{(v_i,v_{i+1})}(t_i), i = 1, \ldots, k.$$

Definition 3. Lower-bound Graph. Given a $G(V,E,T)$, the corresponding Lower-bound Graph $\underline{G}(V,E)$ is a graph with the same topology (i.e, nodes and edges) as graph G, where the weight of each edge $c_{v_i,v_j}$ is fixed (not time-dependent) and is equal to the minimum possible weight $$c_{v_i,v_j}^{min}$$

where $$\forall e(v_i, v_j) \in E, t \in T c_{v_i,v_j}^{min} \leq c_{v_i,v_j}(t).$$

Definition 4. Lower-bound Travel Cost. The lower-bound travel-time $LTT(s \rightsquigarrow d)$ of a path is less than the actual travel-time along that path and computed with respect to $\underline{G}(V,E)$ as $$LTT(s \rightsquigarrow d) = \sum_{i=1}^{k-1} c_{v_i,v_{i+1}}^{min}, i = 1, \ldots, k.$$

Definition 5. Upper-bound Graph. Given a $G(V,E,T)$, the corresponding Upper-bound Graph $\overline{G}(V,E)$ is a graph with the same topology as graph G, where the weight of each edge $c_{v_i,v_j}$ is fixed (not time-dependent) and is equal to the maximum possible weight $$c_{v_i,v_j}^{max}$$

where $$\forall e(v_i, v_j) \in E, t \in T c_{v_i,v_j}^{max} \geq c_{v_i,v_j}(t).$$

Definition 6. Upper-bound Travel Cost. The upper-bound travel-time $LTT(s \rightsquigarrow d)$ of a path is greater than the actual travel-time of the path and computed with respect to $\overline{G}(V,E)$ as $$UTT(s \rightsquigarrow d) = \sum_{i=1}^{k-1} c_{v_i,v_{i+1}}^{max}, i = 1, \ldots, k.$$

It is important to note that for each source and destination pair (s,d), $LTT(s \rightsquigarrow d)$ and $UTT(s \rightsquigarrow d)$ are time-independent constant values and hence t is not included in their definitions. Given the definitions of TT, UTT and LTT, the following property always holds for any path in $G(V,E,T)$: $LTT(s \rightsquigarrow d) \leq TT(s \rightsquigarrow d, t_s) \leq UTT(s \rightsquigarrow d)$ where $t_s$ is an arbitrary departure-time from the source. We will use this property in subsequent sections to establish some properties of our proposed solutions.

Definition 7. Time-dependent Fastest Path (TDFP). Given a $G(V,E,T)$, s, d, and $t_s$, the time-dependent fastest path TDFP $(s,d,t_s)$ is a path with the minimum travel-time among all paths from s to d.

In the rest of this paper, we assume that $G(V,E,T)$ satisfies the First-In-First-Out (FIFO) property. We also assume that objects do not wait at any node. In most real-world applications, waiting at a node is not realistic as it means that the moving object must interrupt its travel by getting out of the road (e.g., exit freeway) and finding a place to park and wait.

Section 4—Exact TDFP: In this section, we explain our bidirectional time-dependent fastest path approach that yields exact solution. With our approach, we generalize bidirectional A* algorithm proposed for static spatial networks (see Ira Pohl, Bi-directional Search, Machine Intelligence, Edinburgh University Press, 1971) to time-dependent road networks. Our proposed solution involves two phases. At the off-line precomputation phase, we partition the road network into non-overlapping partitions and precompute lower-bound distance labels within and across the partitions with respect to $\underline{G}(V,E)$. Successively, at the online phase, we use the precomputed distance labels as a heuristic function with our bidirectional time-dependent A* algorithm that performs simultaneous search from source and destination. Below we elaborate on both phases.

Section 4.1—Off-line Phase: The off-line phase of our proposed algorithm includes two main steps in which we partition the road network into non-overlapping partitions and precompute lower-bound border-to-border, node-to-border, and border-to-node distance labels.

Road Network Partitioning: Real-world road networks are built on a well-defined hierarchy. For example, in United States, highways connect large regions such as states, interstate roads connect cities within a state, and multi-lane roads connect locations within a city. Almost all of the road network data providers (e.g., Navteq) include road segment (i.e., edge) class information in their datasets. In this paper, we partition the graph to non-overlapping partitions by exploiting the predefined edge class information in road networks. Specifically, we first use the more important roads (e.g., interstate) to divide the road network into large regions. Then, we subdivide each large region using the next level roads and so on.

With our approach, we assume that the class of each edge class(e) is predefined and we denote the class of a node class(v) by the lowest class number of any incoming or outgoing edge to/from v. The input to our hierarchical partitioning method is the road network and the level of partitioning l. For example, if one likes to partition the road network based on the interstates, freeways, and arterial roads in sequence, we set l=2 where interstate edges represent the class 0. Given the road network and l, we first assign to each node an empty set of partitions. Then, we choose a node $v_i$ that is connected to edges other than the ones used for partitioning (i.e., a node with class($v_i$)>l) and add partition number (e.g., $S_1$) to $v_i$'s partition set. For instance, continuing with our example above, a node $v_i$ with class($v_i$)>2 represent a particular node that belongs a less important road segment than an arterial road. Subsequently, we expand a shortest path tree from $v_i$ to all it's neighbor nodes reachable through the edges of the classes greater than l, and add $S_1$ to their partition sets. Intuitively, we expand from $v_i$ until we reach the roads that are used for partitioning and we stop. At this point we determine all the nodes that belong to $S_1$. Then, we select another node $v_j$ with an empty partition set by adding the next partition number (i.e., $S_2$) to $v_j$'s partition set and repeat the process. We terminate the process when all nodes are assigned to at least one partition. Fortunately, with this method we can easily find the border nodes for each partition, i.e., those nodes which include multiple partitions in their partition sets. In addition, l is tuning parameter with our algorithm: one can arrange the size of l to increase or decrease the size of the partitions.

Definition 8. Given a graph G(V,E,T), the partition of G is a set of subgraphs $\{S_1, S_2, \ldots, S_k\}$ where $S_i=(V_i,E_i)$ includes node set $V_i$ where $V_i \cap V_j = \emptyset$ and $\cup_{i=1}^{k} V_i = V$, i≠j.

Figure 4:
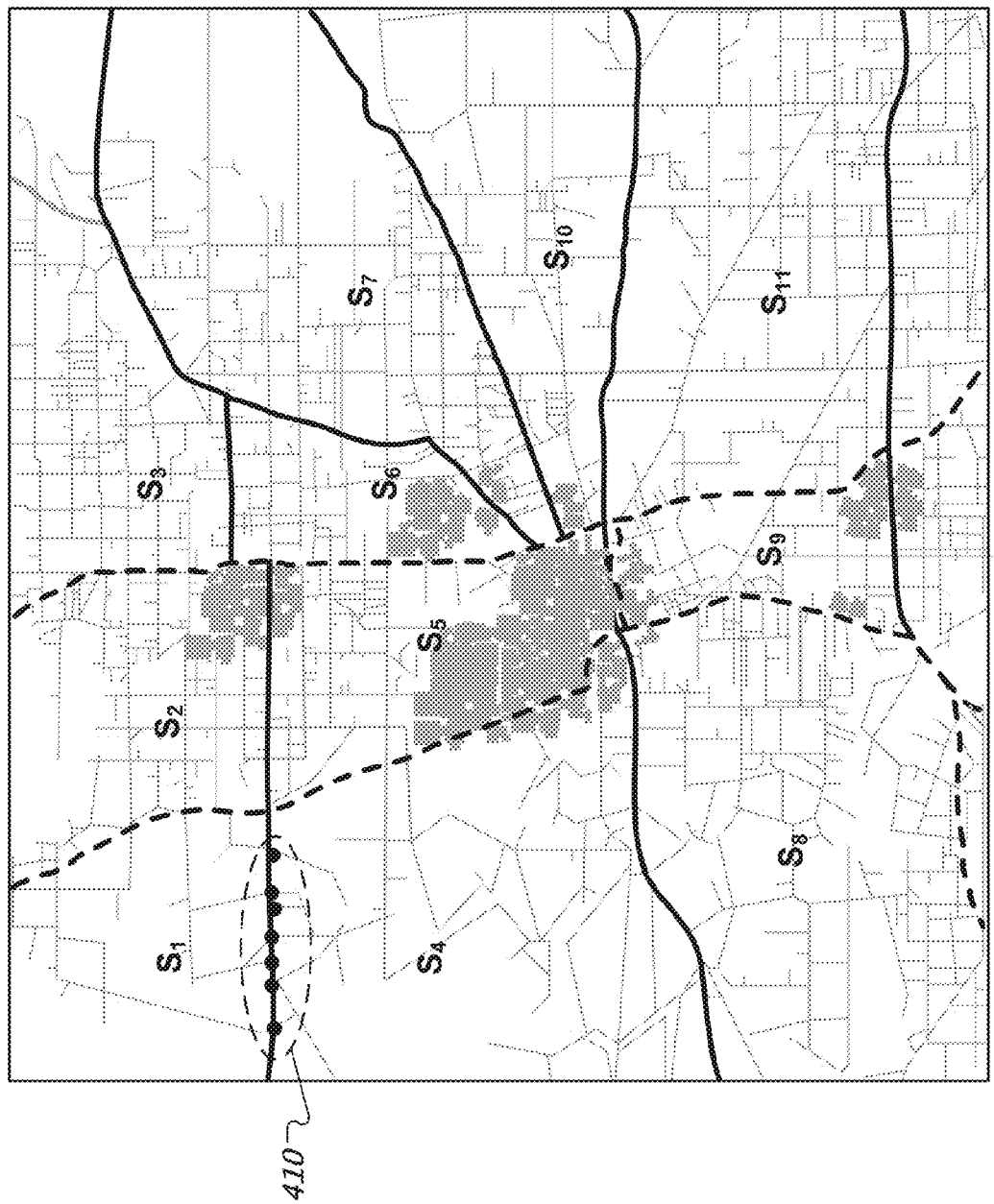
FIG. 4 shows the partitioning of San Joaquin (California) network based on road classes.

FIG. 4 shows the partitioning of San Joaquin (California) network based on the road classes. As shown, higher level edges are depicted with solid lines, as opposed to dashed lines. Each partition is numbered starting from the north-west corner of the road network, the partitions being: $S_1, S_2, S_3, S_4, S_5, S_6, S_7, S_8, S_9, S_{10}$, and $S_{11}$. The border nodes between partitions $S_1$ and $S_4$ are shown in the circled area 410.

We remark that that our proposed time-dependent fastest path computation works independently of the partitioning method, i.e., it yields correct results with all non-overlapping partitioning methods. Another nice feature of our algorithm is that the number of border nodes (which can be potentially large depending on the density of the network) in the actual partitions have a negligible influence on the storage complexity. We explain the effect of the border nodes on the storage cost in the next section.

Figure 5:
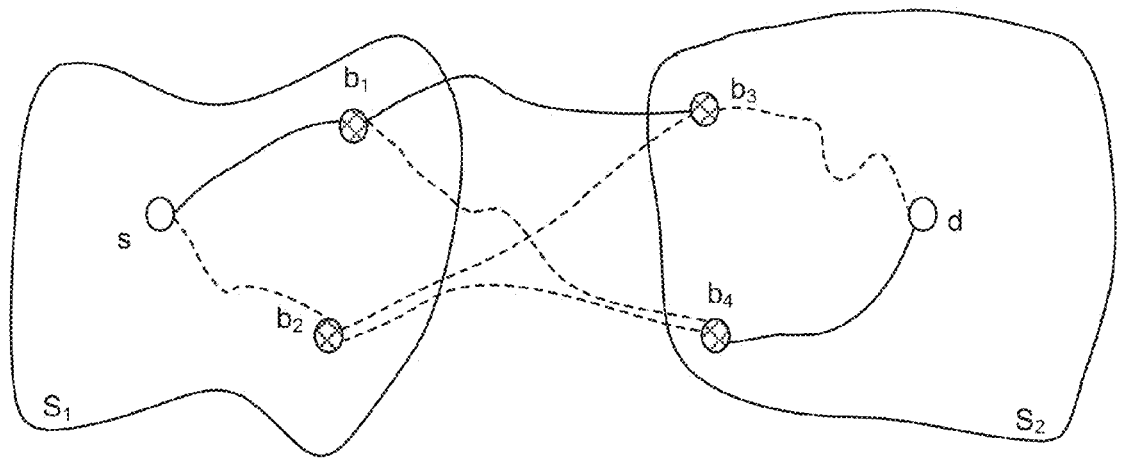
FIG. 5 shows path segments corresponding to precomputation of node-to-border, border-to-border, and border-to-node lower-bound travel-times.

Distance Label Computation: In this step, for each pair of partitions ($S_i, S_j$) we compute the lower-bound fastest path cost with respect to G between each border in $S_i$ to each border node in $S_j$. However, we only store the minimum of all border-to-border fastest path distances. As an example, consider FIG. 5 where the lower-bound fastest path cost between $b_1$ and $b_3$ (shown with solid line) is the minimum among all border-to-border distances between $S_1$ and $S_2$. In addition, for each node $v_i$ in a partition $S_i$, we compute the lower-bound fastest path cost from $v_i$ to all border nodes in $S_i$ with respect to G and store the minimum among them. We repeat the same process from border nodes in $S_i$ to $v_i$. For example, border nodes $b_1$ and $b_4$ FIG. 5 are the nearest border nodes to s and d, respectively. We will use the precomputed node-to-border, border-to-border, and border-to-node lower-bound travel-times referred to as distance labels to construct our heuristic function for online time-dependent A* search.

We maintain the distance labels by attaching three attributes to each node representing a) the partition $S_i$ that contains the node, b) minimum of the lower-bound distances from the node to border nodes, and e) minimum of the lower-bound distances from border nodes to the node (this is necessary for directed graphs). We can keep border-to-border distance information in a hash table. Since we only need store one distance value for each partition pair, the storage cost of the border-to-border distance labels is negligible.

Section 4.2—Online B-TDFP Computation: As showed in An Appraisal of Some Shortest-Path Algorithms (Dreyfus, Operations Research Vol. 17, No. 3, 1969), the time-dependent fastest path problem (in FIFO networks) can be solved by modifying Dijkstra algorithm. Dijkstra algorithm visits all network nodes reachable from s in every direction until destination node d is reached. On the other hand, a time-dependent A* algorithm can significantly reduce the number of nodes that have to be traversed in Dijkstra algorithm by employing a heuristic function h(v) that directs the search towards destination. To guarantee optimal results, h(v) must be admissible, i.e., it must be less than or equal to the actual distance between v and d. With static road networks where the length of an edge is constant, Euclidian distance between v and d is used as h(v). However, this simple heuristic function cannot be directly applied to time-dependent road networks, because, the optimal travel-time between v and d changes based on the departure-time $t_v$ from v. Therefore, in time-dependent road networks, we need to use an estimator that never overestimates the travel-time between v and d for any possible $t_v$. One simple lower-bound estimator is $d_{euc}(v,d)$/max(speed), i.e., the Euclidean distance between v and d divided by the maximum speed among the edges in the entire network. Although this estimator is guaranteed to be a lower-bound, it is a very loose bound, and hence yields insignificant pruning.

With our approach, we obtain a much tighter bound by utilizing the distance labels precomputed in the off-line phase. Assuming that an on-line time-dependent fastest path query requests a path from source s in partition $S_i$ to destination d in partition $S_j$, the fastest path must pass through from one border node $b_i$ in $S_i$ and another border node $b_j$ in $S_j$. We know that the time-dependent fastest path distance passing from $b_i$ and $b_j$ is greater than or equal to the precomputed lower-bound border-to-border (e.g., LTT($b_i,b_j$)) distance for $S_i$ and $S_j$ pair in the off-line phase. We also know that a time-dependent fastest path distance from s to $b_i$ is always greater than or equal to the precomputed lower-bound fastest path distance of s to its nearest border node $b_s$. Analogously, the same is true from the border node $b_d$ (i.e., nearest border node) to d in $S_j$. Thus, we can compute a lower-bound estimator of s by $h_T(s)=LTT(s,b_s)+LTT(b_i,b_j)+LTT(b_d,d)$.

Lemma 1: Given an intermediate node $v_i$ in $S_i$ and destination node d in $S_j$, the estimator $h_T(v_i)$ is a lower-bound of time-dependent fastest path distance from $v_i$ to d passing from border nodes $b_i$ and $b_j$ in $S_i$ and $S_j$, respectively.

Proof. Assume $LTT(b_i,b_j)$ is the minimum border-to-border distance between $S_i$ and $S_j$, and $b'_i$, $b'_j$, are the nearest border nodes to $v_i$ and d in G, respectively. By the definition of G(V,E), $LTT(v_i,b'_j) \leq \overline{TDFP}(v_i,b_i,t_{v_i})$, $LTT(b_i,b_t) \leq TDFP(b_i, b_j,\overline{t_{b_j}})$, and $LTT(b'_j,d) \leq TDFP(b_j,d,t_{b_j})$ Then, we have $h_T(v_i) = LTT(v_i,b'_j) + LTT(b_i,b_t) + LTT(b'_j,d) \leq TDFP(v_i,b_i,t_{v_i}) + TDRP(b_i,b_j,t_{b_j}) + TDFP(b_j,d,t_{b_j})$ Clearly, we can use our $h_T(v)$ heuristic with unidirectional A* search in time-dependent road networks. The time-dependent A* algorithm is a best-first search algorithm which scans nodes based on their time-dependent cost label (maintained in a priority queue) to source similar to An Appraisal of Some Shortest-Path Algorithms (Dreyfus, Operations Research Vol. 17, No. 3, 1969), but with the difference that the label within the priority queue is not determined only by the time-dependent distance to source but also by a lower-bound of the distance to d, i.e., $h_T(v_i)$ introduced above.

To further speed-up the computation, we propose a bidirectional search that simultaneously searches forward from the source and backwards from the destination until the search frontiers meet. However, bidirectional search is not straightforward in time-dependent road networks. This is because it is essential to start the backward search from the arrival-time at the destination. Since the arrival-time to destination $t_d$ depends on the departure-time from the source, exact $t_d$ cannot be evaluated in advance at the query time. We address this problem by running a backward A* search that is based on the reverse lower-bound graph $\overline{G}$ (the lower-bound graph with every edge reversed). The main idea with running backward search in $\overline{G}$ is to determine the set of nodes that will be explored by the forward A* search. Next, we explain our bidirectional time-dependent A* search algorithm.

Given a time-dependent graph G=(V,E,T), s and d, and departure-time $t_s$ from s, let $Q_f$ and $Q_b$ represent the two priority queues that maintain the labels of nodes to be processed with forward and backward A* search, respectively. Let F represent the set of nodes scanned by the forward search and $N_f$ is the corresponding set of labeled vertices (those in its priority queue). We denote the label of a node in $N_f$ by $d_{f,v}$. Analogously, we define B, $N_b$, and for $d_{f,v}$ the backward search. Note that during the bidirectional search F and B are disjoint but $N_f$ and $N_b$ may intersect. We simultaneously run the forward and backward A* searches on G(V,E,T) and $\overline{G}$, respectively (Line 4 in Algorithm 1). We keep all the nodes visited by backward search in a set H (Line 5). When the search frontiers meet, i.e., as soon as $N_f$ and $N_b$ have a node u in common (Line 6), the cost of the time-dependent fastest path $(TDFP)(s,u,t_s))$ from s to u is determined. At this point, we know that $TDFP(u,d,t_u) > LTT(u,d)$ for the path found by the backward search. Hence, the time-dependent cost of the paths (found so far) passing from u is the upper-bound of the time-dependent fastest path from s to d, i.e., $TDFP(s,u,t_s) + TDFP(u,d,t_u) \geq TDFP(s,d,t_s)$.

Figure 6:
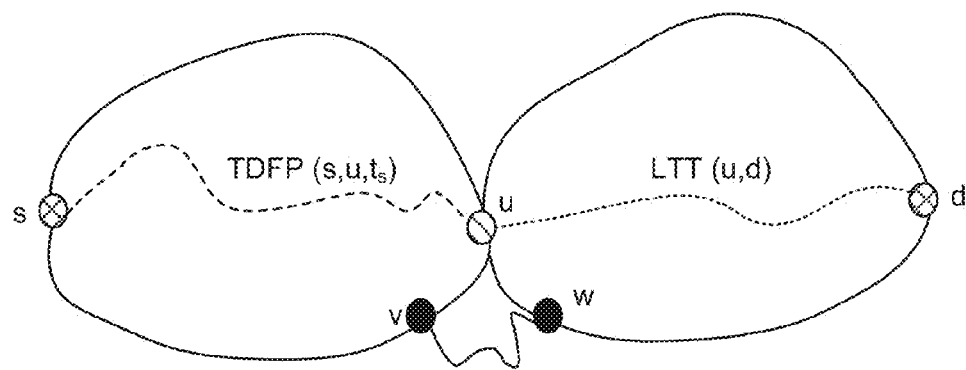
FIG. 6 shows forward and backward searches meeting in a bidirectional search.

As we mentioned, the goal of our backward search is to bound the search space by determining the set of candidate nodes (H) that can be included in the time-dependent fastest path from s to d. If we stop the searches as soon as a node u is scanned by both forward and backward searches, we cannot guarantee finding the time-dependent fastest path from u to d within the set of nodes in H. This is due to the fact that the bidirectional search uses two independent heuristic function for two inner A* algorithm. Specifically, it is possible that there are other paths (not passing from the area bounded by the backward search) in shorter time-dependent distance to d. For instance, consider FIG. 6 where the forward and backward searches meet at node u. As shown, if v is scanned before u by the forward search, then $TDFP(s,u,t_s) > TDFP(s,v,t_s)$.

Similarly if w is scanned before u by the backward search, the $LTT(u,d) > LTT(w,d)$ and hence $TDFP(u,d,t_u) > TDFP(w,d,t_w)$. Thus, it is possible that $TDFP(s,u,t_s) + TDFP(u,d,t_u) \geq TDFP(s,v,t_s) + TDFP(w,d,t_w)$. Therefore, we continue both searches until the $Q_b$ only contains nodes whose labels exceed TDFP$(s,u,t_s) + TDFP(u,d,t_u)$ by adding all visited nodes to H (Line 9-11). Recall that the label (denoted by $d_{b,v}$) of node v in the backward search priority queue $Q_b$ is computed by the time-dependent distance from the destination to v plus the lower-bound distance from v to s, i.e., $d_{b,v} = TDFP(v,d,t_v) + h_T(v)$. Hence, we stop the search when $d_{b,v} > TDFP(s,u,t_s) + TDFP(u,d,t_u)$. As we explained, $TDFP(s,u,t_s) + TDFP(u,d,t_u)$ is the length of the fastest path seen so far (not necessarily the actual fastest path) and is updated during the search when a new common node u' found with $TDFP(s,u',t_s) + TDFP(u',d,t_{u'}) < TDFP(s,u,t_s) + TDFP(u,d,t_u)$. Once both searches stop, H will include all the candidate nodes that can possibly be part of the time-dependent fastest path to d. Finally, we continue the forward search considering only the nodes in H until we reach d (Line 11).

Algorithm 1 B-TDFP Algorithm

1: //Input: $G_T, \overline{G}$, s:source, d:destination, $t_s$:departure time
2: //Output: a $(s,d,t_s)$ fastest path
3: //FS(.):forward search, BS(.):backward search, $N_f/N_b$: nodes scanned by FS/BS, H:nodes visited by BS, $d_{b,v}$:label of the minimum element in BS queue
4:  FS($G_T$) and BS($\overline{G}$)
5:  H←visitedByBS( )
6:  If $N_f \cap N_b \neq \emptyset$ then u←$N_f \cap N_b$
7:  M = $TDFP(s,u,t_s) + TDFP(u,d,t_u)$
8:  end I f
9:  While $d_{b,v} >$ M
10: H←visitedByBS( )
11: End While
12: Continue_FS(H)
13: return $(s,d,t_s)$ Lemma 2: Algorithm 1 finds the correct time-dependent fastest path from source to destination for a given departure-time $t_s$.

Proof. We prove Lemma 2 by contradiction. The forward search in Algorithm 1 is the same as the unidirectional A* algorithm and our heuristic function $h_T(v)$ is a lower-bound of time-dependent distance from u to v. Therefore, the forward search is correct. Now, let $P(s,(u),d,t_s)$ represent the path from s to d passing from u where forward and backward searches meet and ω denotes the cost of this path. As we showed ω is the upper-bound of actual time-dependent fastest path from s to d. Let φ be the smallest label of the backward search in priority queue $Q_b$ when both forward and backward searches stopped. Recall that we stop searches when φ>ω. Suppose that Algorithm 1 is not correct and yields a suboptimal path, i.e., the fastest path passes from a node outside of the corridor generated by the forward and backward searches. Let P* be the fastest path from s to d for departure-time $t_s$ and cost of this path is α. Let v be the first node on P* which is going to be explored by the forward search and not explored by the backward search and $h_b(v)$ is the heuristic function for the backward search. Hence, we have $\phi \leq h_b(v) + LTT(v,d)$, $\alpha \leq \omega < \phi$ and $h_b(v) + LTT(v,d) \leq LTT(s,v) + LTT(v,d) \leq TDFP(s,v,t_s) + TDFP(v,t,t_v) = \alpha$, which is a contradiction. Hence, the fastest path will be found in the corridor of the nodes labeled by the backward search.

Section 5—Approximate TDFP: As discussed, in the real-world, when source s and destination d nodes are relatively far away, humans prefer to select paths hierarchically, i.e., drive on the nearest arterial street which connects to freeway, drive on the freeway to a location close to d, exit freeway and reach d using an arterial street. The paths found hierarchical strategy may not be the optimal but commonly accepted as the best path due to the fact that higher level road segments offer uninterrupted (e.g., smaller number of turns, no traffic lights) and safer travel. Because of their simplicity and popularity in real-world traveling, hierarchial route planning approaches have been widely studied in academia and industry in static road networks (e.g., R. Agrawal and V. H. Jagadish, Algorithms for searching massive graphs, ICDE, 1994; Ackijana Car and Andrew U. Frank, Modelling a hierarchy of space applied to large road networks, IGIS, 1994; and P. Sanders and D. Schultes, Highway hierarchies hasten exact shortest path queries, ESA, 2005). In this section, we propose a hierarchal time-dependent lastest path (H-TDFP) approach that finds approximate fastest path in time-dependent networks. Similar to B-TDFP, H-TDFP involves two phases; an off-line precomputation phase and on-line hierarchal time-dependent fastest path computation phase. At the off-line phase, we decompose G(V,E,T) into hierarchial subgraphs based on the hierarchy inherent in road networks and determine the transit nodes that connect the subgraphs to either lower or upper subgraph. At the online-phase, we compute the approximate time-dependent fastest path starting from the lowest level and then carry out exploring the hierarchy levels in ascending order, hence most of the search is conducted at the topmost level. Since the number of nodes at each level shrinks rapidly as the search progresses upward through the hierarchy, the total number of the explored nodes is considerably smaller than that of the plain fastest path algorithms.

Section 5.1—Off-line. Phase: The off-line phase of H-TDFP includes two steps. We discuss these steps in sequence.

Figure 7:
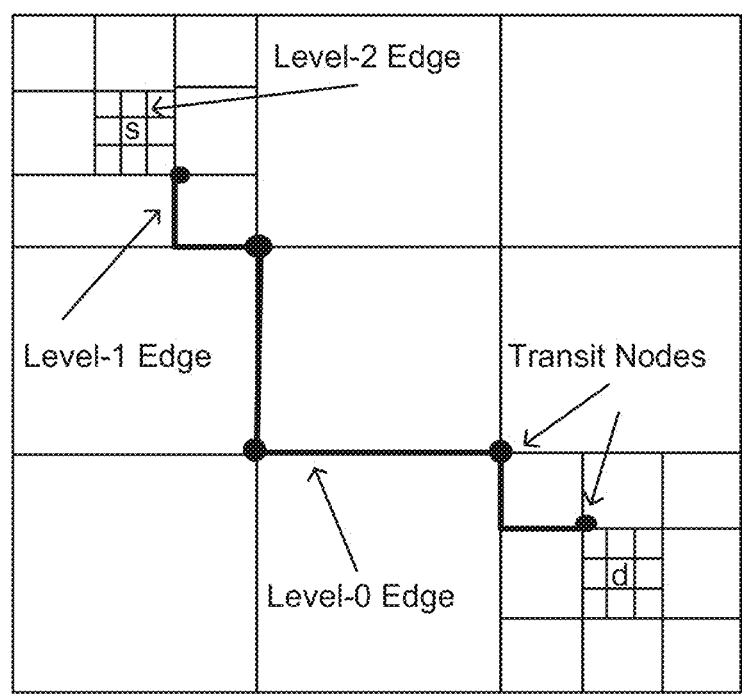
FIG. 7 shows a hierarchal network with three levels.

Hierarchial Graph Construction: At the first step, we construct a hierarchial graph structure for the road network by grouping the edges and nodes based on the classification of the streets such as interstate highways, freeways, local roads, etc (the road-class information is widely available in road network datasets). Specifically, we label each edge and node with a number representing the level of the hierarchy to which they belong. For example, the root level edges are labeled with 0 (e.g., Interstates in US road network) corresponding to the highest level of the graph. Each level of the hierarchy contains all the edges of that particular level plus all edges of the upper levels (e.g., the level-1 graph contains the edges of the level-0 graph). The lowest level contains the entire graph (i.e., the edges from all classes). Each level is entered or exited with a transit node which are connected to nodes in both lower and higher levels. Transit nodes can be considered as the exit and entry junctions to freeways in real-life and this information is also available in road networks datasets. FIG. 7 depicts a hierarchal network (on a simple grid model to show the hierarchical path computation) with three levels where the hierarchical fastest path from s to d that goes through transit nodes is shown by the thick line.

Definition 9. Graph Hierarchy. Given the road network graph G(V,E,T), the corresponding graph hierarchy includes set of subgraphs $\{H_0, H_1, \ldots, H_k\}$ where $H_i(V_i,E_i)$ is the level i of the G and it satisfies $H_0 \subset H_1 \subset \ldots, \subset H_k$. Let $\deg_i(v)$ denote the degree of a node $v \in V_i$ in $H_i$, the transit nodes in a level are defined by $VT_i = \{v | v \in V_i \cap V_{i+1}, \deg_i(v) \geq \deg_{i+1}(v)\}$.

Given a time-dependent fastest path query in a hierarchial graph, the main challenge with finding a hierarchial path is the uncertainty of the transit node through which we start searching the adjacent higher levels. Specifically, the transit node cannot be decided at the beginning of the search and hence one can search a large portion of the graph to find the best transit node that leads through higher levels. We address this challenge by associating each node v in the network to its transit node as explained in Section 5.1.

Core and Extended Region Construction: At the second step, for each level of the hierarchy, we precompute two subnetworks (regions) around each transit node called Core Regions (CR) and Extended Regions (ER). In particular, we partition each level $H_i$ into CRs and ERs based on each transit node. The main idea behind creating these regions is to localize the transit node which will carry the search to the next level.

To compute CR for each transit node $z_i$, we use parallel Dijkstra algorithm that expands fastest path trees simultaneously, one tree rooted at each transit node. The fastest path tree rooted at $z_i$ is expanded using upper-bound travel-time (i.e., UTT), while the fastest path trees rooted at all other transit nodes are expanded using lower-bound travel-times (i.e., LTT). The expansion of the tree rooted at $z_i$ is stopped as soon as it meets other expansion trees. The subnetwork covered by fastest path tree of $z_i$ is the Core Region of $z_i(CR(z_i))$. Clearly, the time-dependent travel-time from any node in $CR(z_i)$ to $z_i$ is guaranteed to be faster than the travel-time to any other transit node. Thus, CRs in each level allows us to find the closest (in time-dependent travel-time) transit node of a network node without performing any time-dependent fastest-path computation during the online computation. We repeat the same process for each transit node to compute its core region. We formally define the core region as follows.

Definition 10. Core Region. Given a subgraph $H_i(V_i,E_i)$ of a road network and its transit nodes $VT=\{z_1, z_2, \ldots, z_n\}$, a core region $CR(z_i)$ specifies a subnetwork around $z_i$ such that for each node $v \in CR(z_i)$, $TDFP(v,z_i,t) \leq TDFP(v,z_j,t)$, where $i=1, 2 \ldots n$, $i \neq j$ and t represents any time in T. The lemma and the proof of core regions are as follows.

Lemma 3: Let Z be a set of transit nodes $Z=\{z_1, z_2, \ldots, z_n\}$ in $G_T$ and $CR(z_i)$ be the core region of a transit node $z_i$. For any point $q \in CR(z_i)$, the shortest travel-time transit node of q is $z_i$, i.e., $\{\forall q \in CR(z_i), \forall z_j \in Z, z_j \neq z_i, TDFP(q,z_i,t) < TDFP(q,z_j,t)\}$.

Proof. We prove the lemma by contradiction. Assume that $z_i$ is not the closest transit node to the query object q. Then there exists a data object $z_j$ ($z_i \neq z_j$) which is closer to q; i.e., $TDFP(q,z_j,t) < TDFP(q,z_i,t)$. Let us now consider a point b (where the shortest path trees of $z_i$ and $z_j$ meet) on the boundary of core region $CR(z_i)$. We denote fastest upper-bound path from $z_i$ to b (i.e., the fastest path among all $UTT(z_i \rightsquigarrow b)$ paths) as $D_{UTT}(z_i,b)$, and similarly, we denote fastest lower-bound path from $z_j$ to b (i.e., the fastest path among all $LTT(z_j \rightsquigarrow b)$ paths) as $D_{LTT}(z_j,b)$. Then, we have $TDFP(q,z_i,t) < D_{UTT}(z_i,b) = D_{LTT}(z_j,b) < TDFP(q,z_j,t)$. This is a contradiction; hence, $TDFP(q,z_i,t) < TDFP(q,z_j,t)$.

Figure 8A:
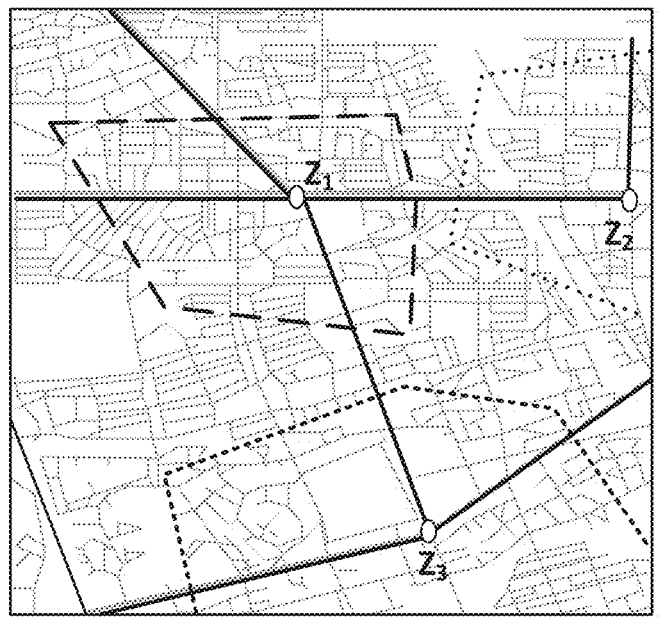
FIGS. 8A and 8B show core regions and extended regions for three transit nodes.

FIG. 8A demonstrates the core regions for three transit nodes, $z_1$, $z_2$, and $z_3$ at a particular level. For the sake of clarity, we represent the core region of each transit node with a polygon that covers the CR subnetwork. As illustrated in FIG. 8A, the set of core regions often does not cover the entire (sub)network. For the cases where source (or destination) node is located in an area which is not covered by any core region, we utilize extended region (ER) to identify the candidate closest transit node. Next, we describe ERs.

Figure 8B:
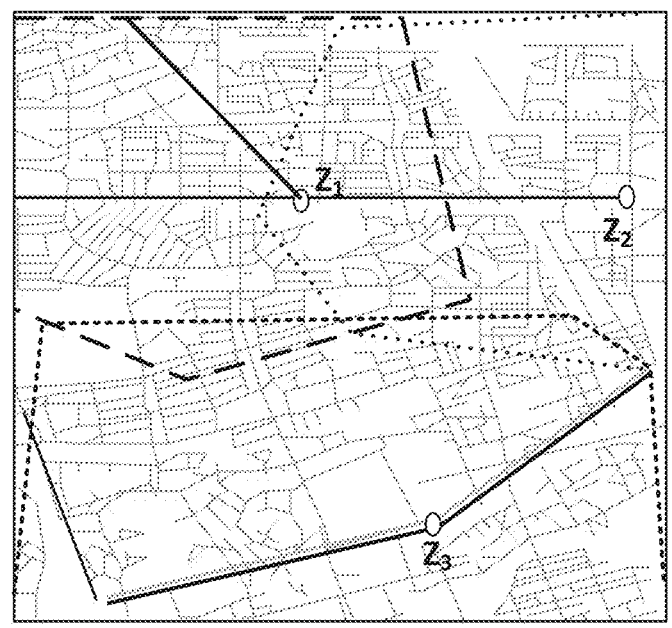

Similar to the construction process for CR, we use parallel Dijkstra algorithm to construct extended region $ER(z_i)$ for a transit node $z_i$. However, this time, we use lower-bound travel-time (i.e., LTT) to expand from $z_i$ and upper-bound travel-time (i.e., UTT) to expand from every other transit nodes. Therefore, the extended region $ER(z_i)$ for the transit node $z_i$ specifies a sub-network around $z_i$ outside which any node is guaranteed not to have $z_i$ as its transit node. We utilize extended regions when the node v cannot be located using CRs (i.e., v falls outside of any CR). In that case, we identify the ER(s) that contain v; based on the definition, the generators of such ER(s) are the only transit node candidates for v. Note that v can be contained in more than one ER. The generators of these ERs are the only possible candidates to be the transit node for v. Therefore, we compute the time-dependent fastest path to find the distance between v and each candidate transit node in order to determine the closest one. As illustrated in FIG. 8B, extended regions, unlike core regions, collectively cover the entire network and have some overlapping regions among each other.

Definition 11. Extended Region. Given a subgraph $H_i(V_i, E_i)$ of a road network and its transit nodes $VT=\{z_1, z_2, \ldots, z_n\}$, an extended region $ER(z_i)$ specifies a subnetwork around $z_i$ such that for each node $v \in ER_i$, $TDFP(v, z_i, t) \geq TDFP(v, z_j, t)$, where $j=1, 2 \ldots n$, $i \neq j$ and t represents any time in T. The proof of the extended region is straightforward and similar to that of the core region.

Lemma 4: Let Z be a set of transit nodes $Z=\{z_1, z_2, \ldots, z_n\}$ in $G_T$ and $ER(z_i)$ be the extended region of a transit node $z_i$. If any point q is outside of $ER(z_i)$, $z_i$ is guaranteed not to be the nearest transit node to q, i.e., $\{\forall q \notin ER(z_i), \exists z_j \in Z, z_j \neq z_i, TDFP(q, z_i, t) > TDFP(q, z_j, t)\}$.

Proof. We prove the lemma by contradiction. Assume that $z_i$ is the nearest neighbor of a q, even though the q is outside of $ER(z_i)$; i.e., $TDFP(q, z_i, t) < TDFP(q, z_j, t)$. Suppose there exists a data object $z_j$ whose extended region $ER(z_j)$ covers q. Let b be a point on the boundary of $ER(z_i)$. Then, we have, $TDFP(q, p_j, t) < D_{UTT}(z_j, b) = D_{LTT}(z_i, b) < TDFP(q, z_i, t)$. This is a contradiction; hence, $z_i$ cannot be the nearest transit node to q.

As mentioned before, the concept of core and extended regions is introduced in U.S. patent application Ser. No. 13/278,060, where the road network is partitioned based on the point of interests for efficient processing of k nearest neighbor queries in time-dependent road networks. We refer the readers to this study for additional proofs of CR and ER properties.

Finally, to expedite the process of finding the closest transit node during online computation, we attach an attribute to each node v which points to CR and ER(s) that contain v. In this way, for a given v, the transit node can be determined either immediately (if the node is contained by a CR) or with a low-cost refinement operation (if the node is contained in more than one ER).

Section 5.2—Online H-TDFP Computation: We mentioned that if source s falls inside one of the core regions, the generator of that core region is the exit node for transition to next higher level. On the other hand, if s falls outside all the core regions, then the generator of the extended regions that contain s are the only candidate transit nodes for s. In this case, we compute the actual time-dependent travel-time to these candidates to identify the one with minimum travel-time as the transit node. Clearly, this approach is much more efficient as compared to the naive approach of computing the time-dependent travel-time from s to all possible transit nodes. Below we explain the implementation of our proposed bidirectional hierarchical path algorithm; Algorithm 2 present the pseudocode of H-TDFP.

| Algorithm 2 H-TDFP(s,d,G(V,E,T)) |
| --- |
| 1: // Input= G: graph, s:source, d:destination, i:level of s, j:level of d |
| 2: // Output= HP:Hierarchical path |
| 3: if i≠j Then |
| 4: If i < j Then s' ← findTransitnode(s); |
| 5: $P_f^i$ = B-TDFP(s,s', $t_s$); s = s'; i = i + 1; $t_s = t_{s'}$; |
| 6: If i > j Then d'←findTransitnode(d); |
| 7: $P_b^j$ = B-TDFP(d,d',$d_t$), d = d'; j = j + 1; $t_d = t_{d'}$; |
| 8: End I f |
| 9: If i = j and localityfilter(s,d) = 1 then |
| 10: s'←findTransitnode(s); d'←findTransitnode(d) |
| 11: $P_f^i$ = B-TDFP(s,s', $t_s$) and $P_b^i$ = B-TDFP(d,d', $t_d$) |
| 12: s = s'; i = i + 1; $t_s = t_{s'}$ and d = d'; j = j + 1; $t_d = t_{d'}$; |
| 13: else $P_l$ = B-TDFP(s,d,$t_s$) |
| 14: HP = combine($P_f^i$, $P_b^j$, $P_l$) |
| 15: End If |
| 16: Return HP |

Given a hierarchical graph, the source s and destination d where $s \in V_i$ and $d \in V_j$, $0 \leq i,j \leq k$ (i and j represent the level of s and d, respectively), H-TDFP conducts forward search from s and backward search from d simultaneously. Depending on the levels at which s and d are located (i.e., values of and j), the searches climb in the hierarchy of the network by finding the forward and backward paths (Line 3 to 8). Since the transit nodes are precomputed (for each node), only one point-to-point fastest path is computed within a hierarchy, i.e., from local-node to its transit-node that connects to higher level hierarchy (Line 5, Line 7). When searches from both direction reach at the same level (Line-9), we use a function (i.e., localityfilter( )) to decide if we need to continue our search on a higher level or locally. For example, if source and destination are very close to each other (i.e., localityfilter(s,d)=0), we do not need to compute the fastest path via transit nodes anymore. Instead, we compute the fastest path on the last level where the forward and backward searches reached (Line-13). To find the final path, we combine the paths computed in the last level ($P_l$) with the lower level forward and backward paths (i.e., $P_f^i, P_b^j$) found so far. Note that localityfiter( ) is a tuning function; i.e., depending on the closeness heuristic used in the hierarchial path planing this function can be tuned. With our approach, we decide on switching to higher level search based on the adjacency of the partitions. In particular, if s and d are in the same partition or the partitions that contain s and d are adjacent, we run a local search, otherwise, we switch to the higher level.

Section 6—Experimental Evaluation Section: 6.1—Experimental Setup: We conducted extensive experiments with different spatial networks to evaluate the performance of B-TDFP and H-TDFP. As of our dataset, we used California (CA), Los Angeles (LA) and San Joaquin County (SJ) road network data (obtained from Navteq [21]) with approximately 1,965,300, 304,162 and 24,123 nodes, respectively. We conducted our experiments on a server with 2.7 GHz Pentium Core Duo processor with 12 GB RAM memory.

Time-dependent Network Modeling: At our research center, we maintain a very large-scale and high resolution (both spatially and temporally) traffic sensor (i.e., loop detector) dataset collected from the entire Los Angeles County highways and arterial streets. This dataset includes both inventory and real-time data for 6300 traffic sensors covering approximately 3000 miles. The sampling rate of the streaming data is 1 reading/sensor/min. We have been continuously collecting and archiving the traffic sensor data for over two years, We use this real-world dataset to create time varying edge weights; we spatially and temporally aggregate sensor data by assigning interpolation points (for each 5 minutes) that depict the travel-times on the network segments. Based on our observation, all roads are un-congested between 9 PM and 5 AM, and hence we assume static edge weights during this interval. In order to create time-dependent edge weights for the local streets in LA as well as the entire CA and SJ road network, we developed a traffic modeling approach (based on our observations from LA dataset) that synthetically generates the edge travel-time profiles. Our approach uses spatial (e.g., locality, connectivity) and temporal (e.g., rush hour, weekday) characteristics to generate travel-time for network edges that does not have readily available sensor data.

Section 6.2 —Results: In this section we report our experimental results from our fastest path queries in which we determine the source and destination nodes uniformly at random. We also pick our departure-time randomly and uniformly distributed in time domain T. The average results are derived from 1000 random s–d queries. Since the experimental results for both SJ and LA differ insignificantly, we only present the results for LA and CA.

Performance of B-TDFP and H-TDFP: In our first set of experiments, we studied a) preprocessing times, b) the average number of relaxed edges, c) average query time, d) error rate, and e) relative error (for H-TDFP). As we mentioned H-TDFP yields approximate results and hence, we compare H-TDFP to B-TDFP based on the error rate and average relative error. By error rate, we measure the percentage of computed suboptimal paths over the total number of queries. On the other hand, by average relative error, we evaluate the relative percentage increase of the approximated solution over that of the optimum, computed as $c|c'-1$ where c and c' are the costs of the approximate and the optimum solutions, respectively.

Table 1 shows the preprocessing time (PrePr.), number of labeled nodes (#Nodes), response time (Res. Time), and error rates of time-dependent Dijkstra (D-TDFP) implemented based on Dreyfus (An Appraisal of Some Shortest-Path Algorithms, Operations Research Vol. 17, No. 3, 1969), unidirectional A* search (U-TDFP) where we use our proposed heuristic function in the search, our proposed bidirectional A* search B-TDFP, and hierarchial time-dependent fastest path computation H-TDFP. To implement U-TDFP and B-TDFP, we divide CA and LA network to 60 (which roughly correspond to counties in CA) and 25 partitions, respectively. With both LA and CA networks, we observe a relatively high trade-off between the query results and precomputation. Our proposed bidirectional A* algorithm performs approximately one order of magnitude better than the time-dependent Dijkstra approach depending on the network. As shown, the preprocessing time is directly proportional to network size; preprocessing time increases for larger networks.

TABLE 1

Experimental Results

|  | Algorithm | PrePr [h:m] | #Nodes | Res. Time [ms] | Error Rate-Relative |
|---|---|---|---|---|---|
| CA | D-TDFP | 0:00 | 1162323 | 4804.11 | 0.00%-0.00% |
|  | U-TDFP | 2:11 | 90575 | 310.17 | 0.00%-0.00% |
|  | B-TDFP | 2:11 | 67172 | 182.06 | 0.00%-0.00% |
|  | H-TDFP | 1:13 | 428 | 17.13 | 45.4%-6.89% |
| LA | D-TDFP | 0:00 | 210384 | 2590.07 | 0.00%-0.00% |
|  | U-TDFP | 0:47 | 11115 | 147.23 | 0.00%-0.00% |
|  | B-TDFP | 0:47 | 6681 | 101.22 | 0.00%-0.00% |
|  | H-TDFP | 0:25 | 242 | 8.46 | 52.1%-8.29% |

Figure 9B:
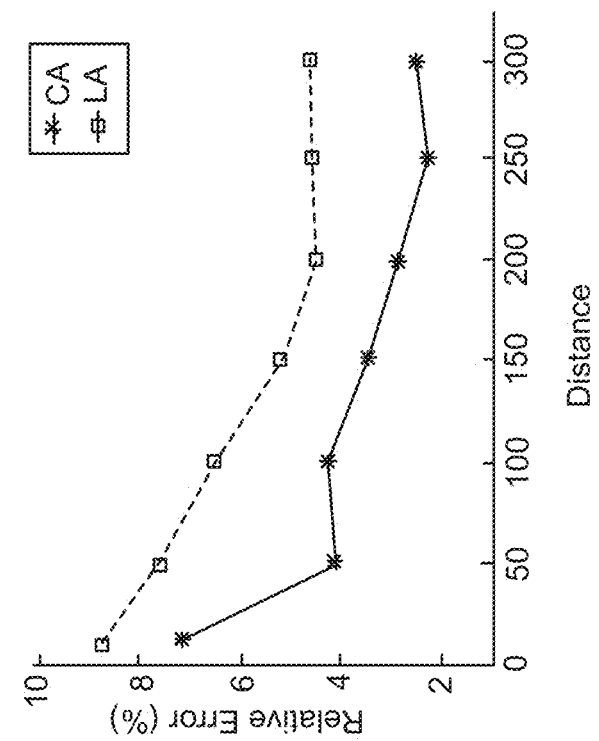
FIG. 9B plots the variation versus path length according to the set of experiments.
Figure 9A:
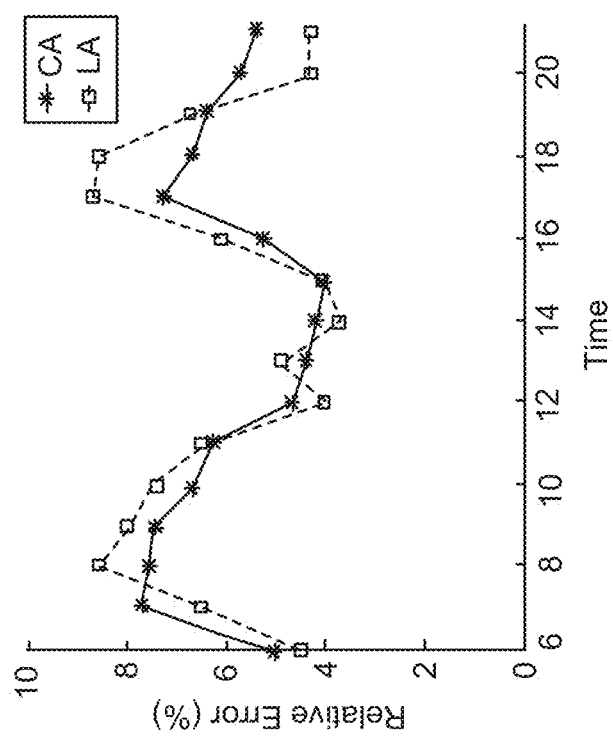
FIG. 9A plots the relative error versus time according to a set of experiments.

As expected, the performance of H-TDFP is several magnitudes faster than other algorithms. The response time of H-TDFP is more than two orders of magnitude faster than D-TDFP. This is because, with H-TDFP, the network size at each level shrinks significantly hence incurring low computation costs. An interesting observation is that 45% to 52% of the paths found by H-TDFP is not the optimal; however, the relative error of these paths is still small (around 7%). This means that the costs of the paths offered by H-TDFP do not deviate too much from the costs of the optimal paths found by B-TDFP. In order to understand whether the suboptimal results are mostly due to queries at different time of the day or due to small vs. large distance fastest path queries, we measured the variations of H-TDFP with respect to time of the day and distance. FIG. 9A plots the relative error versus time ranging from 6:00 AM to 9:00 PM. As shown, the relative error is higher around rush hours. This is because time-dependent weights of each upper-level network segment (e.g. highway) change significantly during rush hours and hence, B-TDFP offers more alternative (short-cut) segments. FIG. 9B plots the variation versus path length ranging from 10 miles to 300 miles. In this case, we observe that H-TDFP yields better results (near to optimal) for long distance queries. This is because for small distances B-TDFP finds fastest path on mostly local streets instead of higher level roads.

Figure 10B:
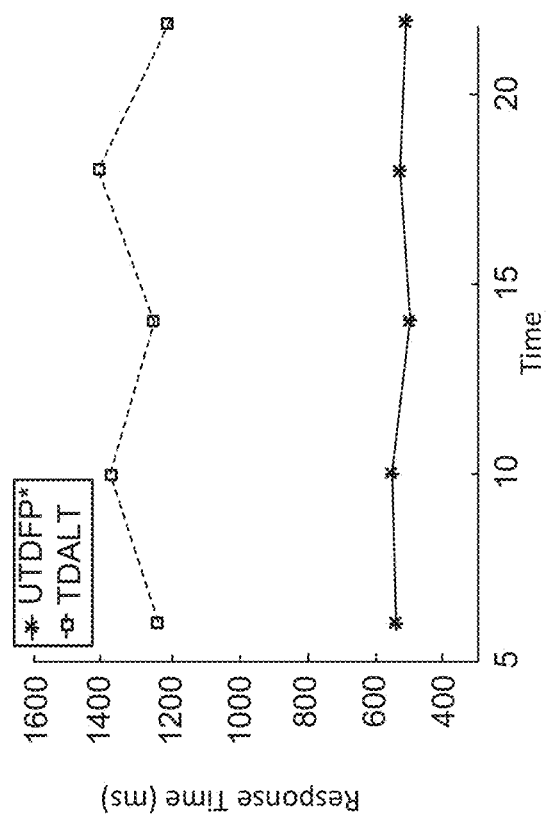
FIG. 10B the response time of U-TDFP compared with time-dependent ALT (TDALT).
Figure 10A:
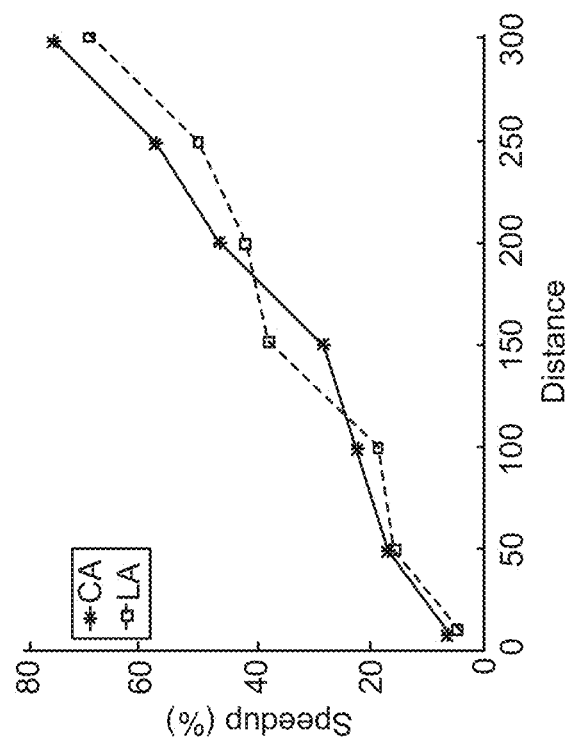
FIG. 10A shows the speed-up with respect to distance according to another set of experiments.

In another set of experiments, we study the impact of path length (i.e., distance from source to destination) on the speed-up of bidirectional search. Hence, we measured the performance of B-TDFP and U-TDFP with respect to distance by varying the path distance between s and d FIG. 10A shows the speed-up with respect to distance. We observe that the speed-up is significantly more especially for long distance queries. The reason is that for short distances the computational overhead incurred by B-TDFP is not worthwhile as U-TDFP visits less number of nodes anyway.

Comparison with Competitors: As we discussed, the preprocessing time and storage requirements of SHARC and CH is not practical for real-world large time-dependent road networks. Hence, we compare our algorithm with time-dependent ALT approach with respect to storage and response time. We note that we computed distances (i.e., travel-time) between each node and the landmarks with respect to G. For a fair comparison, we run both algorithms unidirectionally (in CA network). The performance of ALT heavily relies on the choice of landmarks. Since selecting good landmarks is very difficult, several heuristics have been proposed. Among these heuristics, we use the best known technique; maxCover with 64 landmarks. Under this setting, to store the precomputed distances, ALT attaches to each node an array of 64 elements corresponding to the number of landmarks. Assuming that each array element takes 2 bytes of space, the additional storage requirement of ALT is 63 Megabytes. On the other hand, with our algorithm, we divide CA network to 60 partitions and store the intra and inter partition distance labels. The total storage requirement of our proposed solution is 8.5 Megabytes where we consume, for each node, an array of 2 elements (corresponding to from and to distances to the closest border node) plus the border-to-border distance labels. As shown in FIG. 10B the response time of our proposed solution (U-TDFP) is approximately four times better than that of the time-dependent ALT (TDALT) for all times. This is because the search space of TDALT approach is severely affected by the quality of the landmarks which are selected based on a heuristic. Specifically, TDALT yields very loose bounds based on the location of the source and destination, and hence the large search space. In addition, with each iteration, TDALT needs to find the best landmark (among 64 landmarks) which yields largest triangular inequality distance for better pruning; it seems that the overhead of this operation is not negligible. On the other hand, UTDFP yields a more directional search with the help of intra and inter distance labels with no additional computation.

Quality of Lower-bounds: As discussed the performance of time-dependent A* search depends on the lower-bound distance. In this set of experiments, we analyze the quality of our proposed lower-bound computed based on the distance labels explained in Section 4.1. We define the lower-bound quality with following equation, $$\text{lower-bound quality} = \frac{\delta(u, v)}{d(u, v)},$$

where $\delta(u,v)$ and $d(u,v)$ represent the estimated and actual distances between nodes u and v, respectively. Table 2 reports the lower-bound quality based on three different heuristic function, namely naive, ALT, and DL (i.e., our heuristic function computed based on distance labels). Similar to other experiments, the values in Table 2 are obtained by running unidirectional time-dependent A* fastest path between 1000 pairs of nodes where the source node and the departure-times are selected uniformly at random between 6:00 AM and 9:00 PM. We compute the naive lower-bound estimator by $$\frac{d_{euc}(u, v)}{\max(\text{speed})},$$

i.e., the Euclidean distance between u and v is divided by the maximum speed among the edges in the entire network. We obtain the ALT lower-bounds based on G and the maxCover technique with 64 landmarks. As shown, DL provides better heuristic function for any pair of nodes in both LA and CA road networks. The reason is that the ALT lower-bounds rely on the distribution of the landmarks, and hence depending on the location of the source and destination it is possible to get very loose bounds. On the other hand, the lower-bounds computed based on distance labels are more directional. Specifically, with our approach the source and destination nodes must reside in one of the partitions and the (border-to-border) distance between these partitions is always considered for the lower-bound computation,

TABLE 2

| | Lower-bound Quality | | |
|---|---|---|---|
| Network | Naïve (%) | ALT (%) | DL (%) |
| CA | 21 | 52 | 71 |
| LA | 33 | 56 | 73 |

Figure 11B:
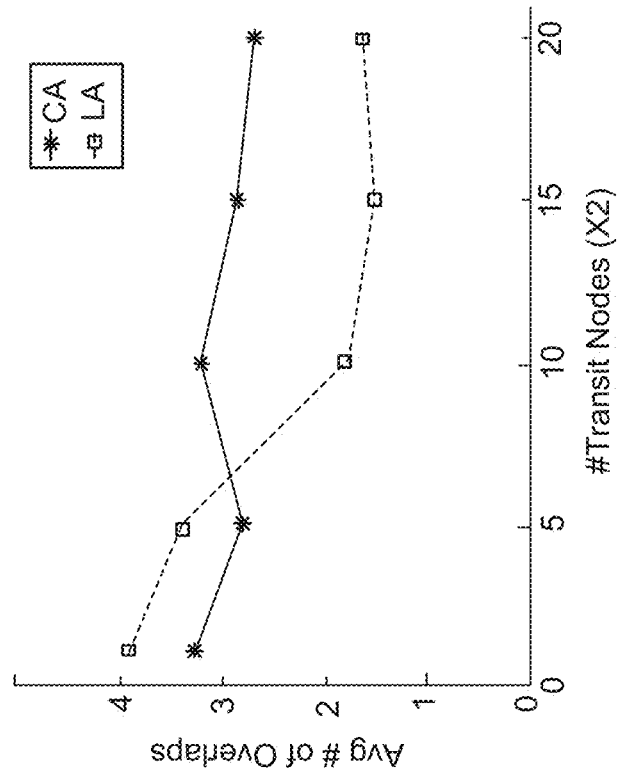
FIG. 11B shows the average number of neighbor regions with varying transit node cardinalities.
Figure 11A:
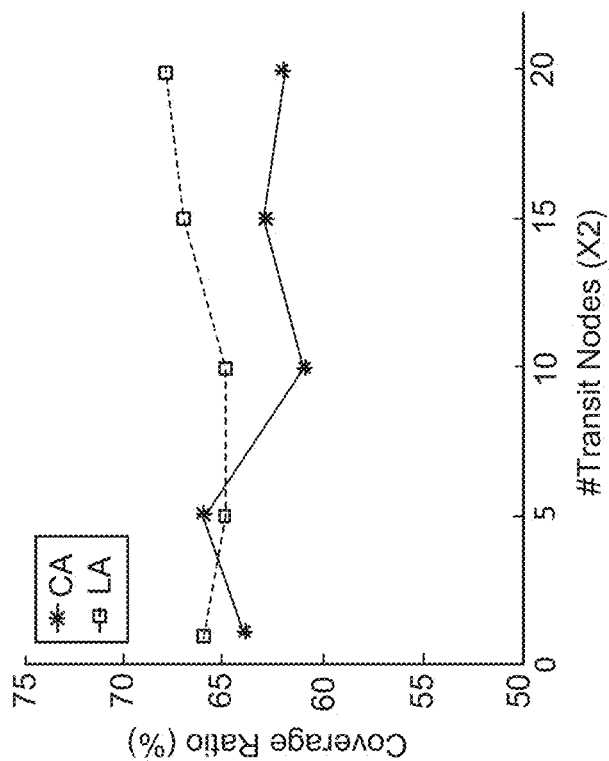
FIG. 11A shows the coverage ratio of the core regions with varying transit node cardinalities on two data sets.

Network Coverage of H-TDFP: As we explained, if a transit node is located in a certain core region cell $CR(z_i)$, our algorithm immediately reports $z_i$ as the first transit node towards the adjacent level. Therefore, it is essential to asses the coverage area of the core regions over the entire network. FIG. 11A shows the coverage ratio of the core regions with varying transit node cardinalities on two data sets. As shown, the average core region coverage is about 71% of the entire network for both LA and CA. This implies that the transit node of a query can be answered immediately 7 out of 10 times with no further computation. Another important parameter affecting HTDS algorithm is the average number of overlapping ERs for each node. FIG. 11B shows the average number of neighbor regions with varying transit node cardinalities. As shown, the number of overlapping areas is less than 4 for both LA and CA.

Section 7—Conclusion and Future Work: In this paper, we proposed two time-dependent fastest path algorithms that are based on bidirectional A* and hierarchal search, respectively. Here, unlike most studies, we assume the edge weights of the network are time varying rather than fixed. Therefore, our approaches yield a much more realistic scenario, and hence, applicable to real-world road networks. We also compared our approaches with those handful of time-dependent fastest path studies. Our experiments with real-world road network and traffic data showed that our proposed approaches outperform the competitors in storage and response time significantly. We intend to pursue this study in two different directions. First, we intend to investigate new data models for effective representation of spatiotemporal road networks. This should assist in supporting development of efficient and accurate time-dependent algorithms, while minimizing the storage and computation costs. Second, to support rapid changes of the traffic patterns (that may happen in case of accidents/events, for example), we plan to study incremental update algorithms for both of our approaches.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method comprising:
   partitioning, in a computer, a road network graph into subgraphs, wherein the road network graph has associated time-dependent edge weights;
   for each one of the subgraphs, which includes interior nodes and border nodes, determining a minimum lower-bound fastest path cost between the border nodes and the interior nodes of the one subgraph, based on minimum edge weight values in the one subgraph;
   for each pair of the subgraphs, determining a minimum lower-bound fastest path cost between respective border nodes of the pair of subgraphs, based on minimum edge weight values between the pair of subgraphs;
   finding a path between a first node in a first of the subgraphs and a second node in a second of the subgraphs using a search directed in accordance with a lower-bound estimator of travel time, the lower-bound estimator comprising the minimum lower-bound fastest path cost between the border nodes and the interior nodes of the first subgraph, the minimum lower-bound fastest path cost between respective border nodes of the first and second subgraphs, and the minimum lower-bound fastest path cost between the border nodes and the interior nodes of the second subgraph.

2. The method of claim 1, wherein the search comprises a first search and a second search, and the finding comprises:
running the first search for the road network graph in a forward direction, directed in accordance with the lower-bound estimator of travel time, with the time-dependent edge weights taken into consideration; and
running, concurrently with the first search, the second search for the road network graph in a backward direction, directed in accordance with the lower-bound estimator of travel time, with minimum possible travel times substituted for the time-dependent edge weights;
wherein, after search frontiers of the first and second searches meet, results of the second search limit nodes to be explored by the first search to find a fastest path.

3. The method of claim 1, wherein the partitioning comprises partitioning the road network graph into the subgraphs based on predefined edge class information for the road network graph.

4. The method of claim 3, wherein determining the minimum lower-bound fastest path cost between the border nodes and the interior nodes of the one subgraph comprises:
determining a minimum lower-bound fastest path cost to any of the border nodes of the one subgraph for each of the interior nodes of the one subgraph; and
determining a minimum lower-bound fastest path cost to any of the interior nodes of the one subgraph for each of the border nodes of the one subgraph.

5. The method of claim 3, wherein the partitioning comprises partitioning the road network graph into a hierarchy of levels of the subgraphs, the finding comprises beginning the search at a first level of the hierarchy and then exploring the hierarchy levels in ascending order, and the method further comprises:
for each of multiple transit nodes connecting adjacent levels of the hierarchy, precomputing a core region and an extended region around the transit node based on lower-bound and upper-bound graphs corresponding to the road network graph; and
identifying one of the multiple transit nodes through which to start searching an adjacent higher level of the hierarchy using the core regions and the extended regions for the transit nodes.

6. The method of claim 5, wherein the precomputing comprises, for each one of the multiple transit nodes, determining the core region by:
expanding a fastest path tree from the one transit node using upper-bound travel-time;
expanding fastest path trees from remaining ones of the transit nodes using lower-bound travel-times; and
stopping expansion of the fastest path tree from the one transit node when it meets the fastest path trees from the remaining ones of the transit nodes.

7. The method of claim 5, wherein the precomputing comprises, for each one of the multiple transit nodes, determining the extended region by:
expanding a fastest path tree from the one transit node using lower-bound travel-time;
expanding fastest path trees from remaining ones of the transit nodes using upper-bound travel-times; and
stopping expansion of the fastest path tree from the one transit node when it meets the fastest path trees from the remaining ones of the transit nodes.

8. The method of claim 5, wherein the identifying comprises, for a given node in a first level of the hierarchy:
checking the core regions for one such core region having the given node inside;
if the one such core region is found, identifying the corresponding transit node as the one of the multiple transit nodes through which to start searching the adjacent higher level of the hierarchy; and
if the one such core region is not found, determining a subset of the extended regions that have the given node inside, and
if the subset contains only one extended region, identifying the corresponding transit node for the one extended region as the one of the multiple transit nodes through which to start searching the adjacent higher level of the hierarchy,
else, identifying a closest transit node, from the transit nodes corresponding to the extended regions of the subset, as the one of the multiple transit nodes through which to start searching the adjacent higher level of the hierarchy.

9. The method of claim 1, comprising providing a user interface including an element that allows selection of a new departure time, after receipt of a query indicating the first node and the second node, to revise the path found between the first node and the second node based on the new departure time.

10. A non-transitory computer-readable medium encoding a computer program product operable to cause data processing apparatus to perform operations comprising:
partitioning a road network graph into subgraphs, wherein the road network graph has associated time-dependent edge weights;
for each one of the subgraphs, which includes interior nodes and border nodes,
determining a minimum lower-bound fastest path cost to any of the border nodes for each of the interior nodes, and
determining a minimum lower-bound fastest path cost to any of the interior nodes for each of the border nodes;
for each pair of the subgraphs, determining a minimum lower-bound fastest path cost between any two border nodes of the pair;
finding a path between a first node in a first of the subgraphs and a second node in a second of the subgraphs using a search directed in accordance with a lower-bound estimator of travel time, the lower-bound estimator comprising the minimum lower-bound fastest path cost from the first node to a border node of the first subgraph, the minimum lower-bound fastest path cost between any two border nodes of the first and second subgraphs, and the minimum lower-bound fastest path cost from a border node of the second subgraph and the second node.

11. The computer-readable medium of claim 10, wherein the search comprises a first search and a second search, and the finding comprises:
running the first search for the road network graph in a forward direction, directed in accordance with the lower-bound estimator of travel time, with the time-dependent edge weights taken into consideration; and
running, concurrently with the first search, the second search for the road network graph in a backward direction, directed in accordance with the lower-bound estimator of travel time, with minimum possible travel times substituted for the time-dependent edge weights;

wherein, after search frontiers of the first and second searches meet, results of the second search limit nodes to be explored by the first search to find a fastest path.

12. The computer-readable medium of claim 10, wherein the partitioning comprises partitioning the road network graph into the subgraphs based on predefined edge class information for the road network graph.

13. The computer-readable medium of claim 12, wherein the partitioning comprises partitioning the road network graph into a hierarchy of levels of the subgraphs, the finding comprises beginning the search at a first level of the hierarchy and then exploring the hierarchy levels in ascending order, and the operations further comprise:

for each of multiple transit nodes connecting adjacent levels of the hierarchy, precomputing a core region and an extended region around the transit node based on lower-bound and upper-bound graphs corresponding to the road network graph; and identifying one of the multiple transit nodes through which to start searching an adjacent higher level of the hierarchy using the core regions and the extended regions for the transit nodes.

14. The computer-readable medium of claim 13, wherein the precomputing comprises, for each one of the multiple transit nodes, determining the core region by:

expanding a fastest path tree from the one transit node using upper-bound travel-time;

expanding fastest path trees from remaining ones of the transit nodes using lower-bound travel-times; and stopping expansion of the fastest path tree from the one transit node when it meets the fastest path trees from the remaining ones of the transit nodes.

15. The computer-readable medium of claim 13, wherein the precomputing comprises, for each one of the multiple transit nodes, determining the extended region by:

expanding a fastest path tree from the one transit node using lower-bound travel-time;

expanding fastest path trees from remaining ones of the transit nodes using upper-bound travel-times; and stopping expansion of the fastest path tree from the one transit node when it meets the fastest path trees from the remaining ones of the transit nodes.

16. The computer-readable medium of claim 13, wherein the identifying comprises, for a given node in a first level of the hierarchy:

checking the core regions for one such core region having the given node inside;

if the one such core region is found, identifying the corresponding transit node as the one of the multiple transit nodes through which to start searching the adjacent higher level of the hierarchy; and if the one such core region is not found, determining a subset of the extended regions that have the given node inside, and if the subset contains only one extended region, identifying the corresponding transit node for the one extended region as the one of the multiple transit nodes through which to start searching the adjacent higher level of the hierarchy, else, identifying a closest transit node, from the transit nodes corresponding to the extended regions of the subset, as the one of the multiple transit nodes through which to start searching the adjacent higher level of the hierarchy.

17. A system comprising:

a user interface device; and one or more computers that interact with the user interface device, the one or more computers comprising at least one processor and at least one memory device, the one or more computers configured and arranged to partition a road network, having associated time-dependent edge weights, into a hierarchy of levels for use in finding a path between nodes of the road network, where the finding comprises beginning a search at a first level of the hierarchy and then exploring the hierarchy levels in ascending order, and the one or more computers configured and arranged to, for each of multiple transit nodes connecting adjacent levels of the hierarchy, precompute a core region and an extended region around the transit node based on lower-bound and upper-bound graphs corresponding to the road network graph, and identify one of the multiple transit nodes through which to start searching an adjacent higher level of the hierarchy using the core regions and the extended regions for the transit nodes.

18. The system of claim 17, the one or more computers configured and arranged to precompute, for each one of the multiple transit nodes, the core region of the one transit node by performing operations comprising:

expanding a fastest path tree from the one transit node using upper-bound travel-time;

expanding fastest path trees from remaining ones of the transit nodes using lower-bound travel-times; and stopping expansion of the fastest path tree from the one transit node when it meets the fastest path trees from the remaining ones of the transit nodes.

19. The system of claim 17, the one or more computers configured and arranged to precompute, for each one of the multiple transit nodes, the extended region of the one transit node by performing operations comprising:

expanding a fastest path tree from the one transit node using lower-bound travel-time;

expanding fastest path trees from remaining ones of the transit nodes using upper-bound travel-times; and stopping expansion of the fastest path tree from the one transit node when it meets the fastest path trees from the remaining ones of the transit nodes.

20. The system of claim 17, the one or more computers configured and arranged to identify the one of the multiple transit nodes through which to start searching the adjacent higher level of the hierarchy by, for a given node in a first level of the hierarchy, performing operations comprising:

checking the core regions for one such core region having the given node inside;

if the one such core region is found, identifying the corresponding transit node as the one of the multiple transit nodes through which to start searching the adjacent higher level of the hierarchy; and if the one such core region is not found, determining a subset of the extended regions that have the given node inside, and if the subset contains only one extended region, identifying the corresponding transit node for the one extended region as the one of the multiple transit nodes through which to start searching the adjacent higher level of the hierarchy, else, identifying a closest transit node, from the transit nodes corresponding to the extended regions of the subset, as the one of the multiple transit nodes through which to start searching the adjacent higher level of the hierarchy.

21. The system of claim 17, wherein the one or more computers comprise a server operable to interact with the user interface device through a data communication network, and the user interface device is operable to interact with the server as a client.

22. The system of claim 17, wherein the user interface device comprises a mobile phone or satellite navigation device.

23. The system of claim 17, wherein the one or more computers comprises one personal computer, and the personal computer comprises the user interface device.

* * * * *